United States Patent [19]

Bundschuh et al.

[11] 3,750,976
[45] Aug. 7, 1973

[54] CINEMATOGRAPHIC PROJECTORS OR THE LIKE AND CARTRIDGES FOR USE THEREWITH

[75] Inventors: John J. Bundschuh; Robert J. Roman, both of Rochester, N.Y.

[73] Assignee: Eastman Kodak Company, Rochester, N.Y.

[22] Filed: Apr. 1, 1970

[21] Appl. No.: 24,657

Related U.S. Application Data

[62] Division of Ser. No. 685,616, Nov. 24, 1967, Pat. No. 3,552,683.

[52] U.S. Cl.................. 242/192, 242/197, 242/207
[51] Int. Cl.. G11b 15/32, G11b 15/66, G11b 23/10
[58] Field of Search.................. 242/192, 197, 180, 242/181, 195, 205, 210, 206, 208, 209; 352/157, 158, 72, 73, 78 R

[56] References Cited
UNITED STATES PATENTS
3,275,253   9/1966   Cherniavskys...................... 242/192
3,386,675   6/1968   Thomsen......................... 242/192 X Primary Examiner—George F. Mautz
Attorney—Robert W. Hampton and James A. Smith

[57] ABSTRACT

A machine such as a cinematographic projector is convertible to accommodate either a film supply cartridge or an unenclosed film supply reel, such conversion being automatically accompanied by corresponding change in the mode of operation of the machine.

11 Claims, 23 Drawing Figures

JOHN J. BUNDSCHUH
ROBERT J. ROMAN
INVENTORS

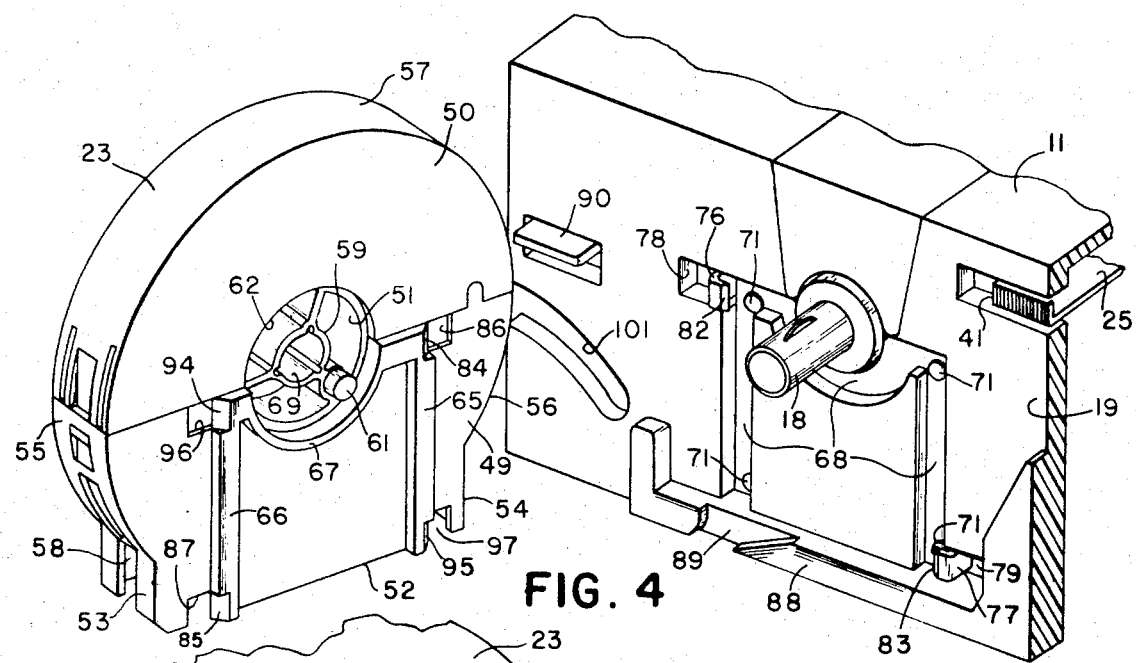
FIG. 4
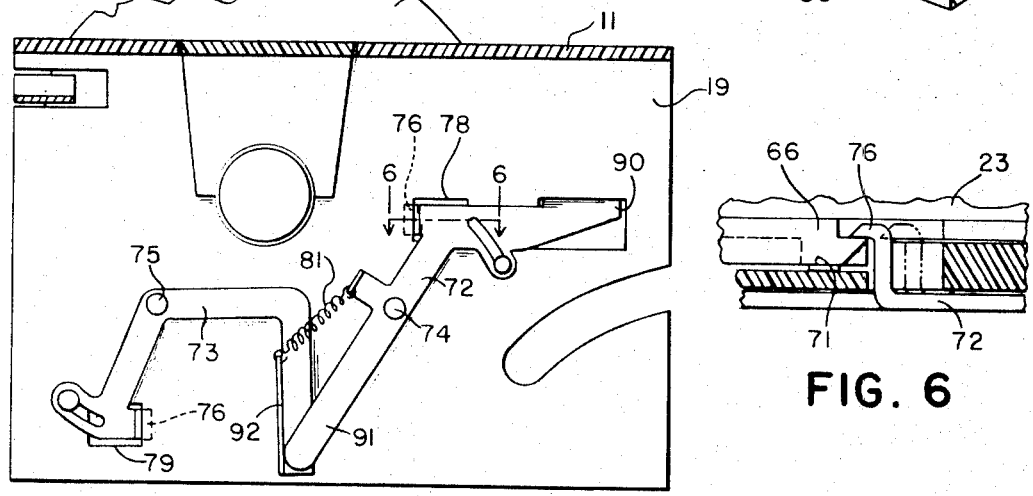
FIG. 5
FIG. 6
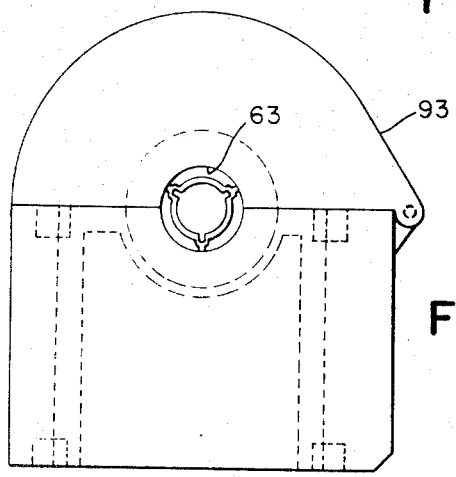
FIG. 7
JOHN J. BUNDSCHUH
ROBERT J. ROMAN
INVENTORS

JOHN J. BUNDSCHUH
ROBERT J. ROMAN
INVENTORS

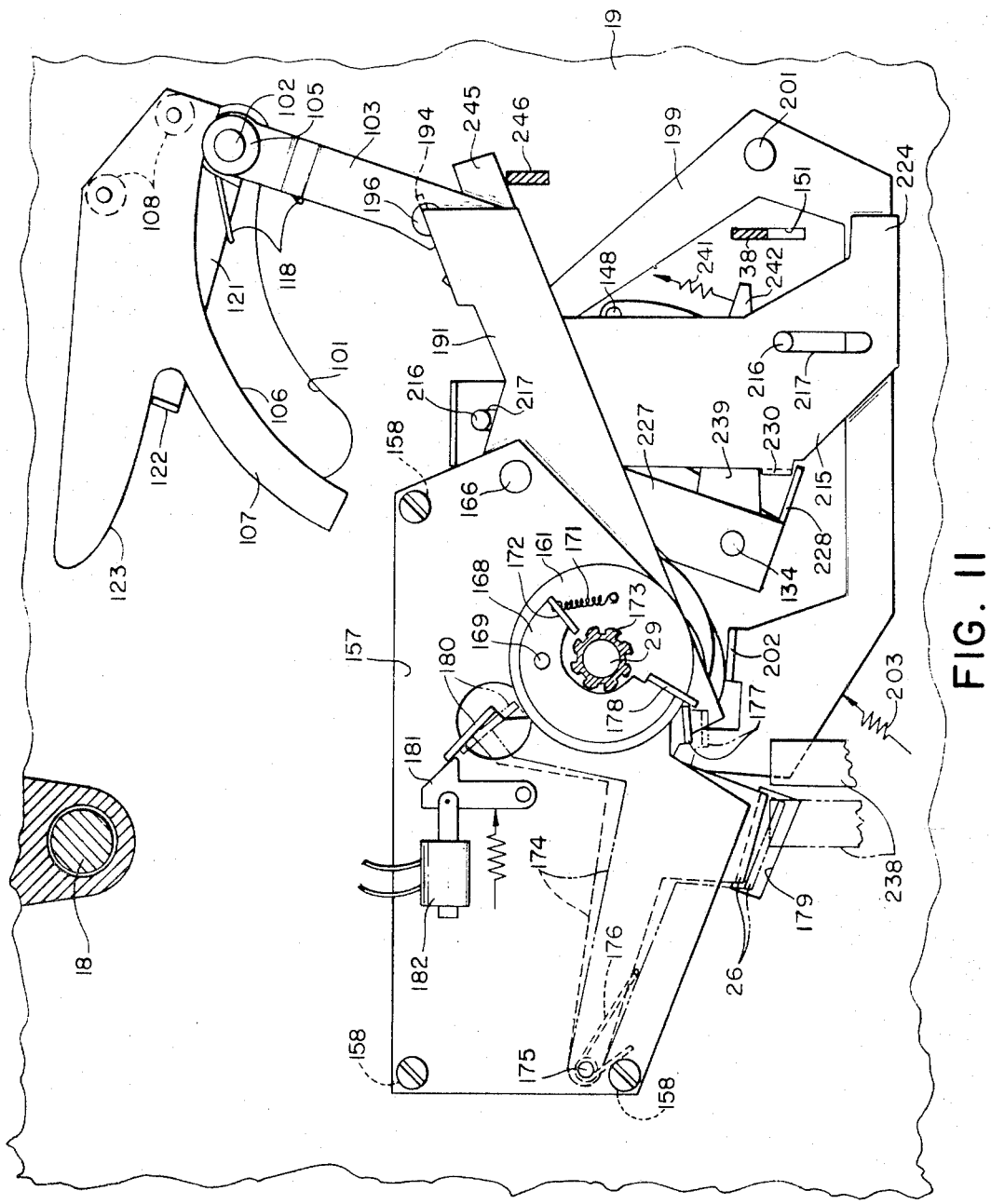

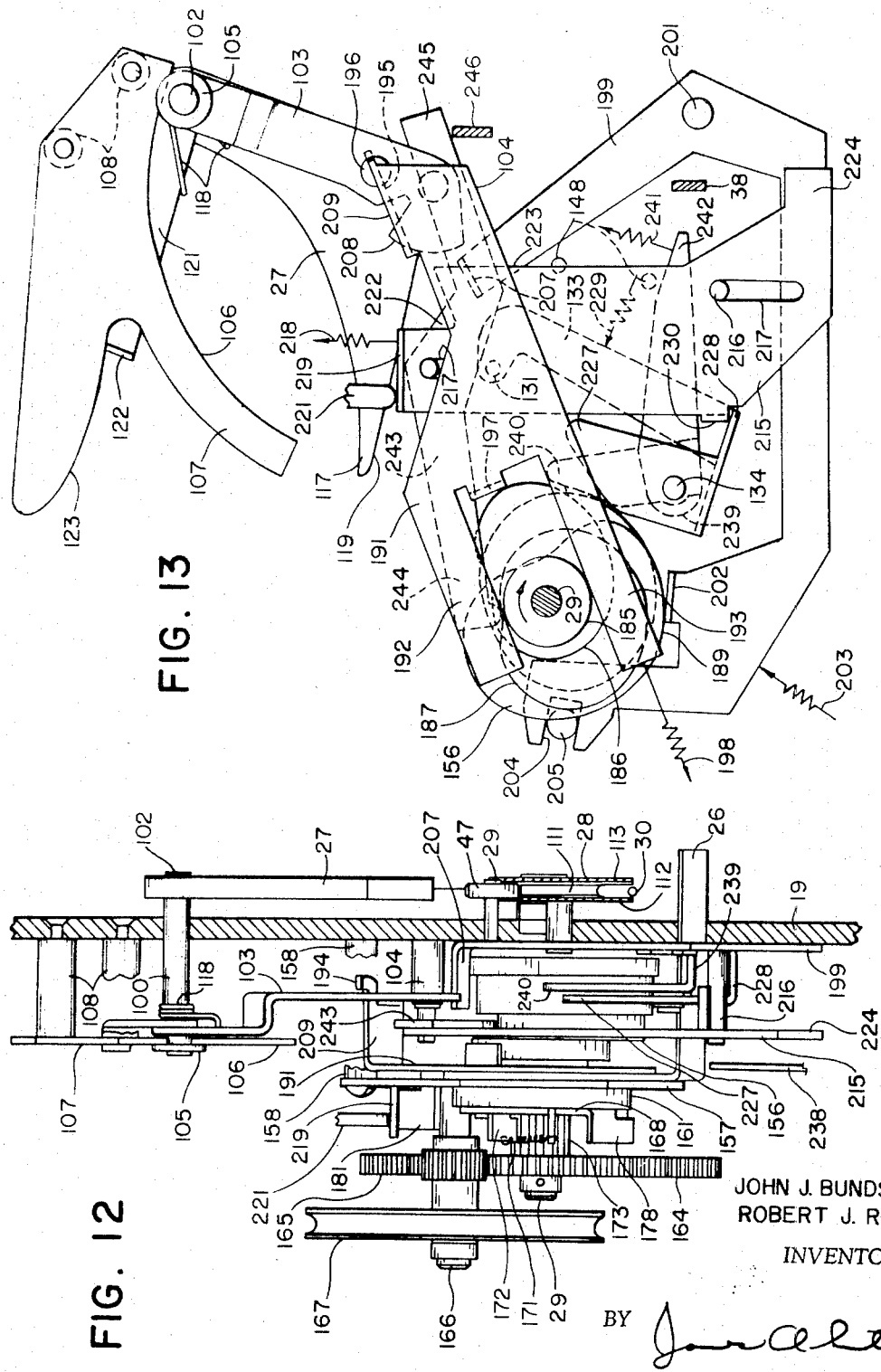

JOHN J. BUNDSCHUH
ROBERT J. ROMAN
INVENTORS

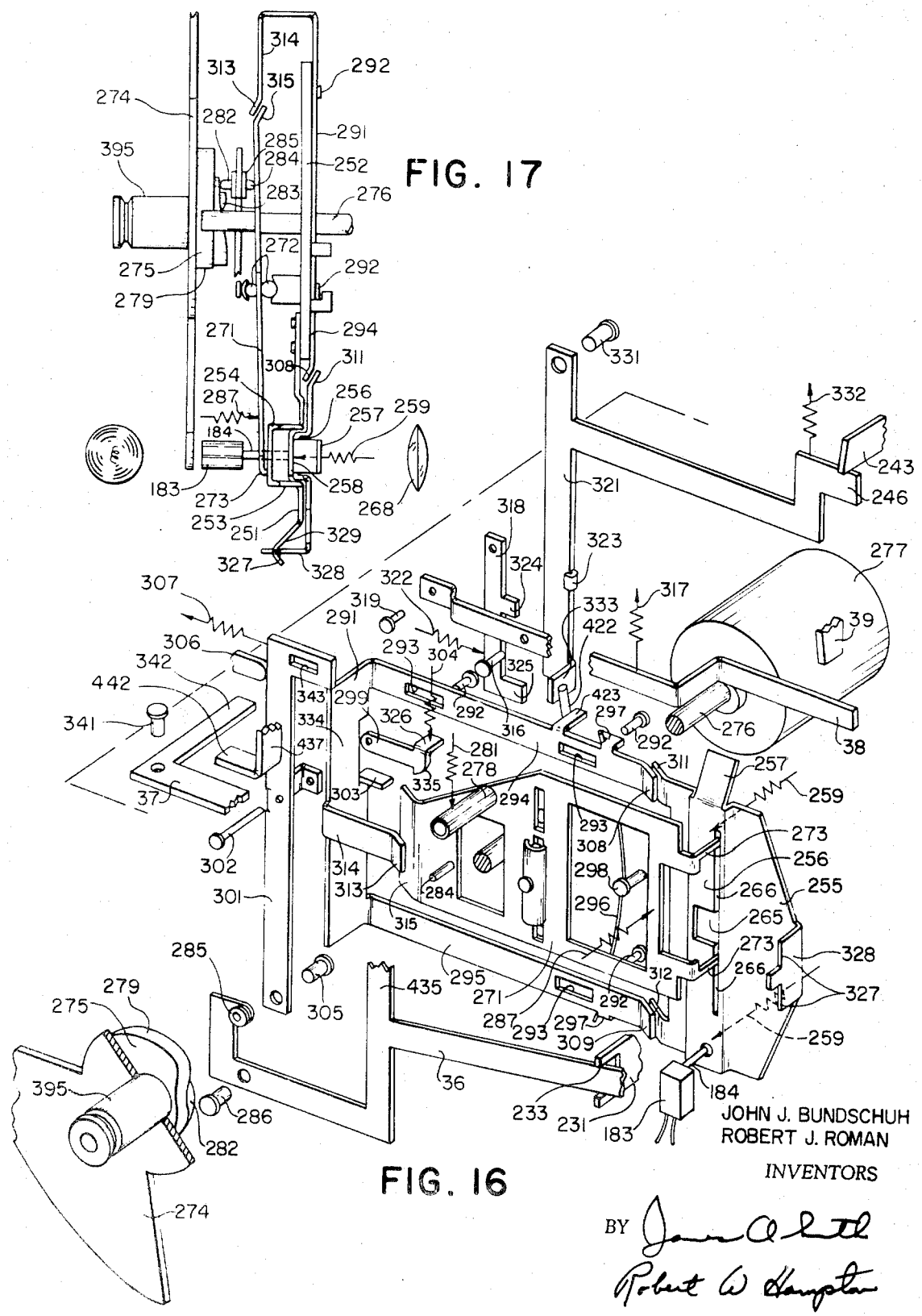

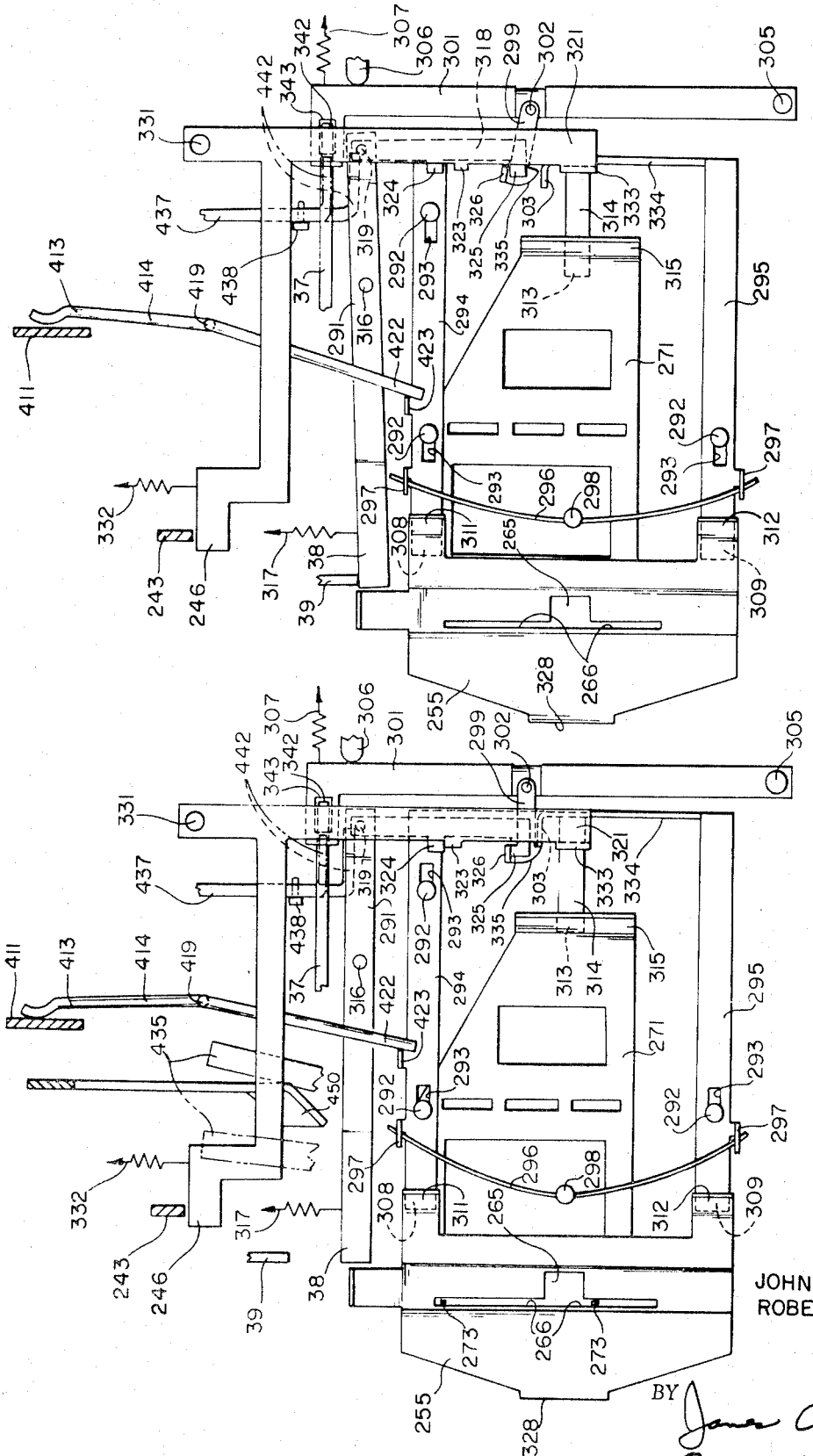

JOHN J. BUNDSCHUH
ROBERT J. ROMAN
INVENTORS

JOHN J. BUNDSCHUH
ROBERT J. ROMAN
INVENTORS

CINEMATOGRAPHIC PROJECTORS OR THE LIKE AND CARTRIDGES FOR USE THEREWITH

This is a division of U.S. application Ser. No. 685,616, filed Nov. 24, 1967, and now U.S. Pat. No. 3,552,683.

CROSS-REFERENCE TO RELATED APPLICATIONS

Reference is made to commonly assigned U.S. Pat. application Ser. No. 643,502, entitled "Cinematographic Cartridge Protector Apparatus," filed in the names of John H. Bundschuh, Robert J. Roman and Kenneth W. Thomson on June 5, 1967 and now U.S. Pat. No. 3,550,879 commonly assigned U.S. Pat. application Ser. No. 470,499, entitled "Automatic Film Stripper," filed in the name of Edward S. McKee on July 8, 1965 and now U.S. Pat. No. 3,429,518; commonly assigned U.S. Pat. application Ser. No. 643,503, entitled "Cartridge for Reel of Strip Material," filed in the names of John J. Bundschuh and Kenneth W. Thomson on June 5, 1967 and now U.S. Pat. No. 3,536,276; commonly assigned U.S. Pat. application Ser. No. 685,588 entitled "Cartridge," filed in the name of John J. Bundschuh, on Nov. 24, 1967, now U.S. Pat. No. 3,648,952 and refiled as a Continuation-in-Part application Ser. No. 736,524; and commonly assigned U.S. Pat. application Ser. No. 685,577, entitled "Supply Roll Spindle Assembly for Cinematographic Projectors," filed in the name of Lester J. Bunting on Nov. 24, 1967 and now U.S. Pat. No. 3,468,498.

BACKGROUND OF THE INVENTION

The present invention relates principally to equipment such as cinematographic projectors or tape transducers adapted to be loaded with supply rolls of elongate strip material, and particularly to such equipment which is convertible to accommodate such supply rolls either in the form of unenclosed reels or in the form of cartridges.

To simplify the use of equipment of the type mentioned above, considerable attention has been directed toward providing means whereby such equipment can be threaded automatically upon being loaded with a supply roll housed within a cartridge; thereby facilitating the handling and storage of the supply rolls and eliminating manual threading operations.

A cartridge-loaded self-threading cinematographic projector system which is generally representative of the aforementioned type of equipment, and which includes a film stripping and threading mechanism and other projector and cartridge features related to those incorporated in the illustrative preferred embodiment of the present invention, is disclosed in commonly assigned copending U.S. Pat. application Ser. No. 643,502, entitled Cinematographic Cartridge Projector Apparatus, filed in the names of John J. Bundschuh, Robert J. Roman and Kenneth W. Thompson on June 5, 1967 and now U.S. Pat. No. 3,550,879. In this construction, a film supply roll wound onto a hub member is housed within a cartridge provided with axial openings through which the hub member can be rotatably supported and driven by a film supply spindle member when the cartridge is operatively positioned on the projector. With the catridge so positioned on the projector, the film roll is radially accessible to a stripping mechanism movable into temporary engagement with the roll through another cartridge opening; such mechanism being adapted to separate the leading end of the strip from the roll and to feed it along a predetermined threading path.

Furthre details and features of this general type of film stripping and threading mechanism and of film supply cartridges adapted for use therewith are also disclosed in related U.S. applications Ser. No. 470,499, entitled Automatic Film Stripper, filed in the name of Edward S. McKee on July 8, 1965 and now U.S. Pat. No. 3,429,518; and 643,503, entitled Cartridge for Reel of Strip Material, filed in the names of John J. Bundschuh and Kenneth W. Thompson on June 5, 1967 and now U.S. Pat. No. 3,536,276.

By employing means of the type disclosed in the aboveidentified applications, it is therefore possible to provide projectors or related devices capable of being loaded or unloaded almost instantaneously by an unskilled operator, and if desired, to provide additional means which allow the device to function entirely automatically from the time the cartridge is loaded thereon and the projection cycle is initiated until such time as the cartridge is again filly rewound following completion of the machine cycle. Furthermore, the adoption of such a system need in no way preclude the employment of other refinements, such as means in a cinematographic projector for allowing the film to be projected either forwards or backwards at an adjustable rate of speed or for allowing it to be partially rewound to permit a desired film sequence to be repeated.

In spite of the foregoing advantages, however, presently known machines of this type are not entirely suitable for applications in which both cartridges and conventional supply reels may be appropriate for different purposes. Althrough equipment has previously been developed for the purpose of overcoming this disadvantage, the means employed therein to allow a cartridge loaded machine to also accommodate conventional reels have sacrificed operating convenience as well as desirable features or functional characteristics which would be available by the use of two separate machines.

SUMMARY OF THE INVENTION

The principal object of the present invention is to overcome those limitations previously associated with self-threading cartridge systems by allowing machines incorporating such systems to be loaded conveniently with supply cartridges of different sizes and also with supply reels, without sacrificing the convenience or performance capabilities of such machines in either mode of operation thereof. Briefly, this objective is accomplished through the cooperation of several novel innovations, including; the employment of means for supporting cartridges of different sizes in predetermined relation to the stripping mechanism and to the supply spindle drive member engaged with the supply roll hub members within the cartridges; adapting the supply spindle assembly to be movable to either a position at which that assembly supports and drives the supply roll within a supply cartridge loaded onto the machine, or to another position at which a supply reel can be accommodated by the spindle assembly without interference with the stripping mechanism; and providing means whereby the leading end of the strip material on a supply reel can be threaded manually into the machine in a convenient manner.

Due to the substantially greater amount of strip material that can be accommodated by supply reels as compared to supply cartridges, considerations of maximum roll diameter and momentum require changes in the mode of operation of the machine according to whether the material is supplied from a reel or from a cart-ridge. In the case of a cinematographic projector, for example, the use of a film supply reel dictates the employment of film tension control means which are incompatible with maintaining the film within corresponding tension limitations while a cartridge is being used. Similarly, the possibility of rewinding the film into a supply cartridge through the film gate becomes impractical in conjunction with the use of a film supply reel, which preferably should be rewound directly from the film take-up reel. In view of these and other related considerations, the subject invention therefore also includes means for automatically adjusting various mechanisms of a projector or analogous machine to perform in accordance with the requirements imposed by the type of supply roll unit with which the machine is loaded.

In addition to the above-mentioned relatively basic features, the illustrated preferred embodiment of the invention also comprises numerous other refinements and improvements of previously known projector components or assemblies, many of such improvements and refinements being equally applicable to other types of projectors or analogous machines.

These and other important objects and features encompassed by the invention will be readily apparent to those skilled in the art from the following detailed description of a cinematographic projector system comprising an illustrative preferred embodiment thereof, reference being made to the accompanying drawings in which like reference characters denote like elements.

BRIEF DESCRIPTION OF DRAWINGS

In the drawings:

FIG. 4 is a perspective illustration of the film cartridge shown in FIGS. 1 and 2 and of the portion of the projector which cooperates with the cartridge to locate and support the latter in loaded position;

FIG. 5 is an elevational view of the opposite side of the portion of the projector shown in FIG. 4, depicting the mechanism by which the cartridge is releasably latched in loaded position;

FIG. 6 is an enlarged partial cross sectional view taken along the line 6—6 of FIG. 5, illustrating the manner in which the cartridge is releasably retained in loaded position by the latch members shown in FIGS. 4 and 5;

FIG. 7 illustrates the profile of an alternate film cartridge, viewed from the same direction as the cartridge shown in FIG. 1 but adapted to accommodate a smaller roll of film;

FIG. 11 is an elevational view of the portion of the projector shown in FIG. 8, taken from inside the projector to show the arrangement of internally located components of the control assembly and the film stripping and threading mechanism;

FIG. 12 is a partially cross sectioned rear elevational view of the film stripping and threading mechanism and of the control assembly shown in FIGS. 8 and 11;

FIG. 13 is a view from the same viewpoint as FIG. 11, depicting the relative positions assumed by the various illustrated elements of the film stripping and threading mechanism and of the control assembly prior to or following completion of the film stripping and threading phase of the operating cycle of the projector;

FIG. 16 is an exploded perspective view of the principal components of the film gate and film pulldown mechanism and of the actuating device employed to open and close the film gate and to adjust the film winding and rewinding mechanism at appropriate times during the operation of the projector;

FIG. 17 is a somewhat schematic top plan view of a portion of the structure shown in FIG. 16;

FIG. 18 is a front elevational view of a portion of the structure shown in FIG. 16, showing the relative positions of the illustrated components when the film gate is in a closed condition;

FIG. 19 corresponds to FIG. 18 and depicts the relative positions of the illustrated components when the film gate is in an open condition;

GENERAL DESCRIPTION

Figure 1:
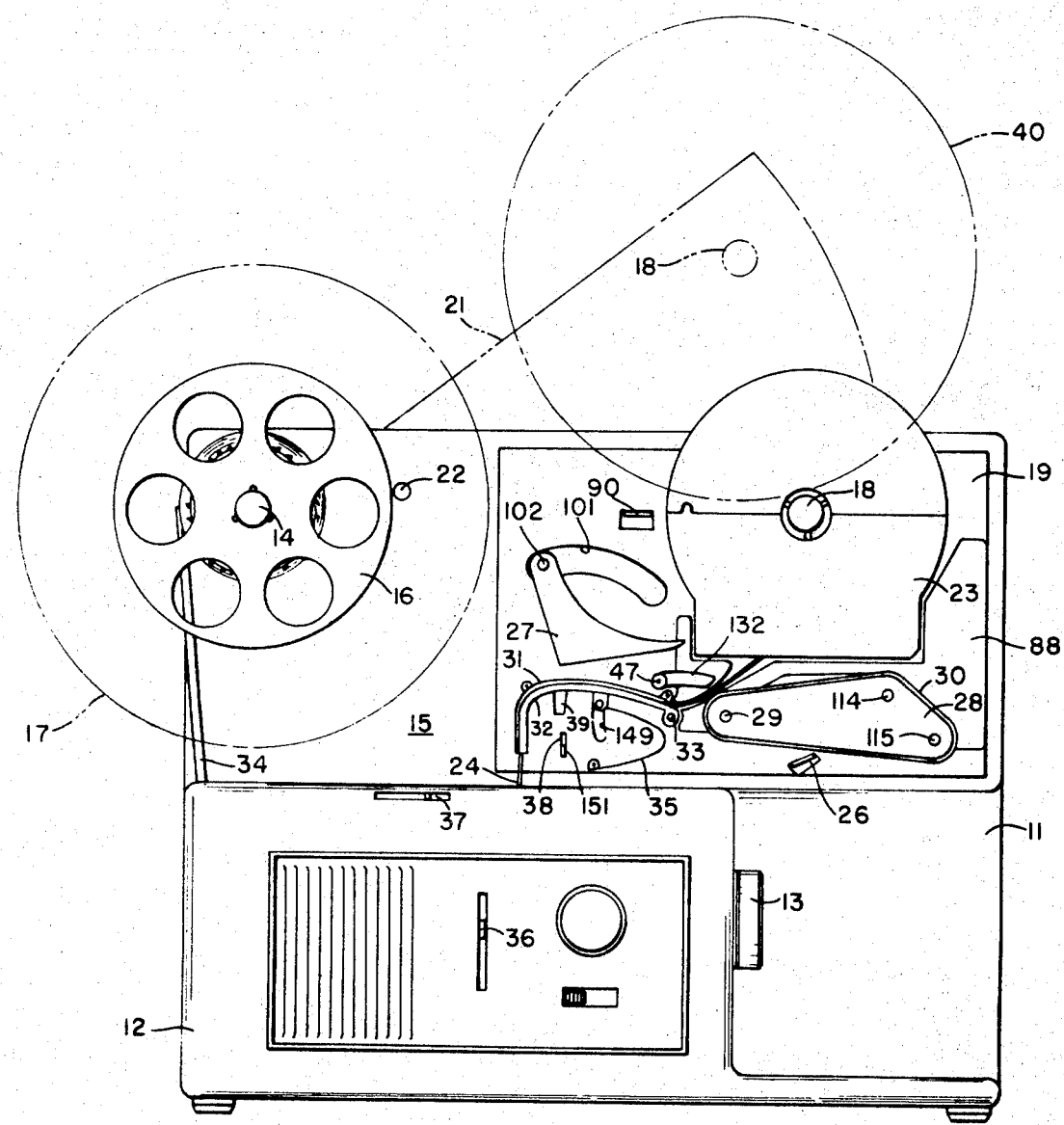
FIG. 1 is an elevational view of the right side of the overall projector, showing a film cartridge in loaded position and indicating in broken lines the positions assumed by the film reels and the film supply spindle arm when the projector is converted to accommodate such reels.
Figure 2:
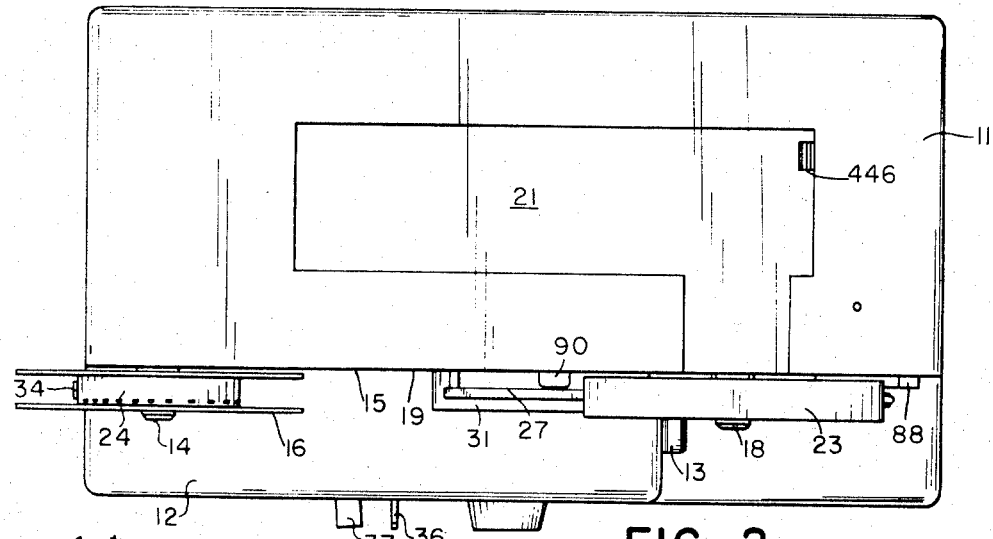
FIG. 2 is a top plan view of the projector shown in FIG. 1.
Figure 3:
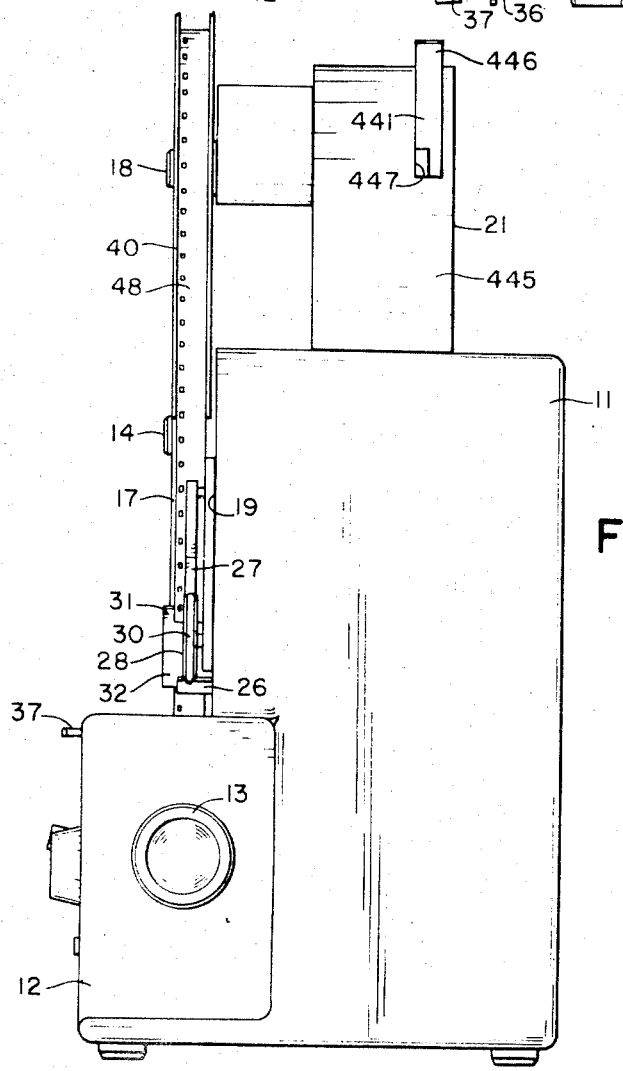
FIG. 3 is a front elevational view of the projector illustrated in FIGS. 1 and 2, showing a film supply reel supported by the raised film supply spindle arm.

To summarize the illustrated preferred embodiment of the present invention, without regard to specific structural and operatonal details hereinafter explained in detail, reference is first made only to FIGS. 1–3. From these figures, it is apparent that the projector comprises a generally rectilinear casing member 11 including a housing 12 which extends laterally toward the right side of the projector and supports a forwardly facing projection lens assembly 13. To simplify subsequent explanations of the projector apparatus, the side of the projector shown in FIG. 1 will be referred to throughout the following disclosure as the right side and references to right or left movement of laterally movable projector elements will be made in the same sense unless otherwise specified. Correspondingly, the terms "front" and "back" and "forward" and "rearward" will be used throughout the disclosure with reference to the front of the projector as shown in FIG. 3. Similarly, references to clockwise or counterclockwise rotation of various elements of the projector mechanism will be made from the viewpoint of either FIG. 1 or FIG. 3.

Above housing 12, rotatable take-up reel drive member 14 extends beyond vertical wall member 15 in coaxial alignment with a corresponding pulley member, which rotates constantly in a clockwise direction during operation of the projector. Drive member 14 is adapted to receive either a relatively small film take-up reel, as shown at 16 in FIGS. 1 and 2, or a larger take-up reel shown at 17 in FIG. 3 and in broken lines in FIG. 1. A similar rotatable drive member 18 likewise extends beyond wall member 15 through mechanism plate 19 in coaxial alignment with another pulley member which is constantly rotated in a counterclockwise direction. This drive member is carried by support arm 21, which is movable about shaft 22 between the lower position shown in solid lines in FIGS. 1 and 2 and the raised position shown in broken lines in FIG. 1 and in solid lines in FIG. 3.

With the arm in its lower position, reel drive member 18 is adapted to receive a film reel, housed within a cartridge loaded onto the projector as shown at 23. To accommodate the film 24 supplied by such a cartridge, the film take-up reel 16 can be of a size generally equivalent to the size of the cartridge as shown in FIGS. 1 and 2. When the arm is in its raise position, however, substantially larger conventional uninclosed film supply and take-up reels can be installed on the respective drive members 18 and 14, thereby allowing greater lengths of film to be projected without interruption. To distinguish between conventional uninclosed film supply reels and film supply reels housed in film cartridges, the latter reels will hereinafter be referred to as spools. Thus, the term "reel mode of operation" will be understood to refer to the operation of the projector with a film supply reel mounted on the raised support arm, as opposed to the term "cartridge mode of operation," which relates to the use of the projector employing a film supply cartridge aligned with drive member 18 of the lowered support arm.

CARTRIDGE MODE OF OPERATION

Figure 20:
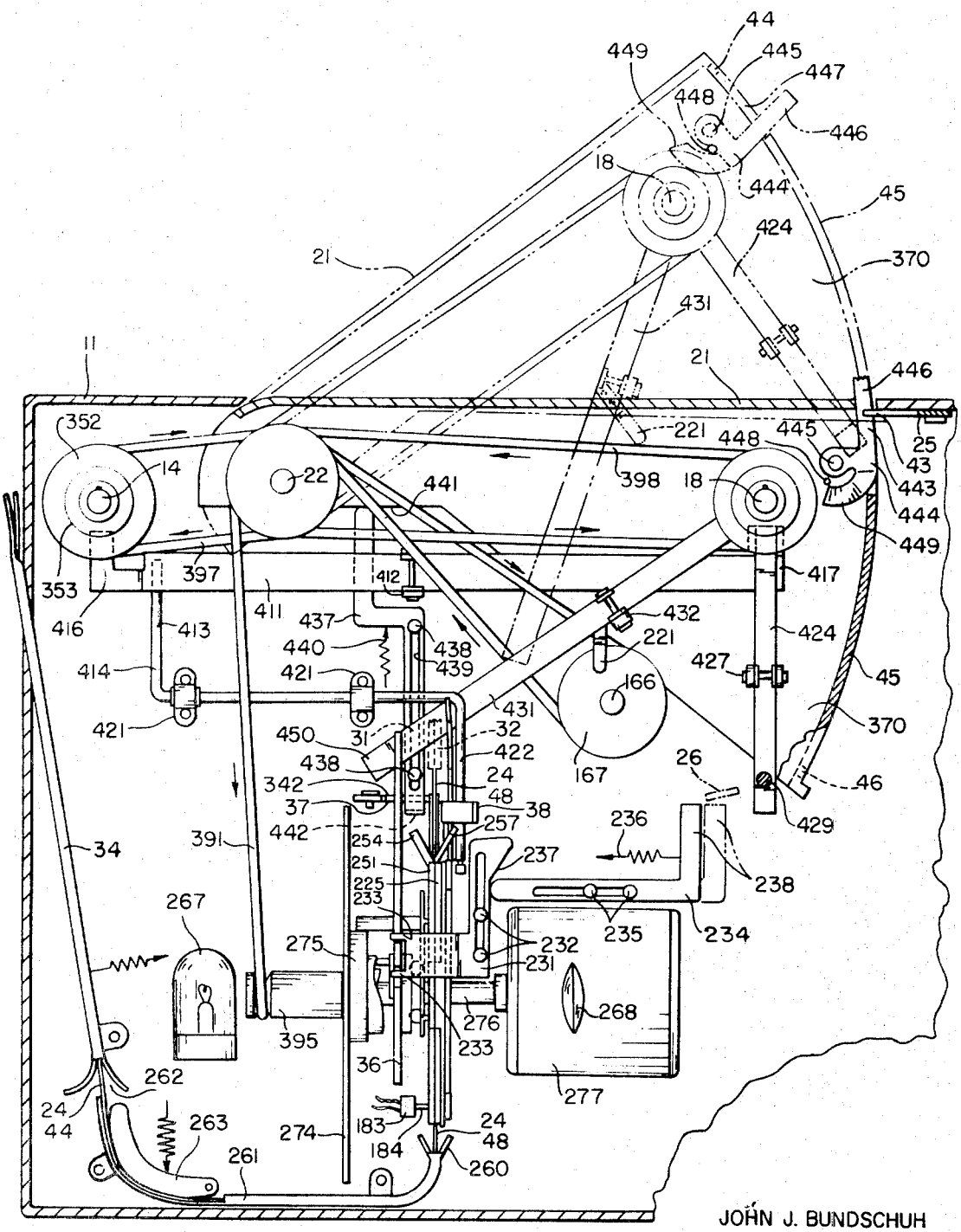
FIG. 20 is a somewhat schematic right side elevational view of the projector, illustrating the driving and shifting means associated with the film winding and rewinding mechanism.
Figure 21:
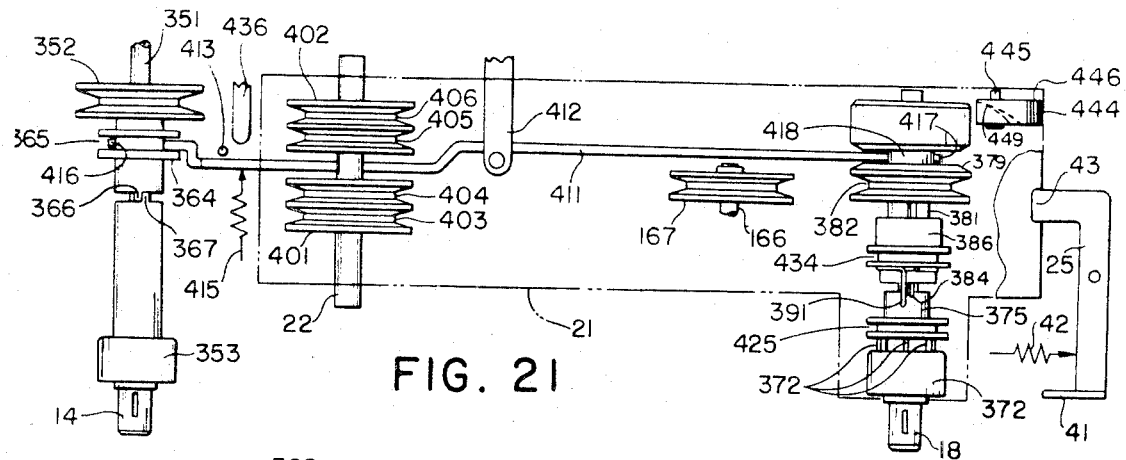
FIG. 21 is a top plan view of a portion of the structure shown in FIG. 20.

To operate the projector utilizing a film supply cartridge 23, support arm 21 is moved to its lower position and latched in place by a latch member 25, shown in FIGS. 20 and 21, which also serves to releasably retain the arm in its raised position. The film cartridge is then moved laterally into its illustrated position adjacent the cartridge plate, where it is releasably latched in place with the cartridge spool in coaxial driving engagement with drive member 18. During this pahse of the projector's operating cycle, drive member 18 is positively connected to the corresponding pulley member so that the cartridge spool is rotated in a counterclockwise direction, tending to maintain the film in a tightly wound condition thereon.

To initiate the film stripping and threading operation, the operator manually depresses ear 26 to a position in which it is releasably retained by a latch mechanism. This causes stripper finger 27 to enter the slotted base portion of the cartridge and thereafter moves stripper belt member 28 in a counterclockwise direction about shaft 29 to bring stripper belt 30 into contact with the periphery of the roll of film on the film supply spool. Concurrently, drive member 18 is released from driving connection with the rotating pulley member so that the cartridge film spool can rotate freely. Correspondingly, drive member 14 is coupled to its pulley member through a frictional clutch adapted to slip under a torque load proportional to the weight of the take-up reel, as determined partially by the amount of film wound thereon.

As described in the above-identified U.S. Pat. application Ser. No. 470,499, now U.S. Pat. No. 3,429,518, the stripper belt is constantly driven in a counterclockwise direction. Therefore, its peripheral engagement with the film supply roll rotates the film roll in a clockwise direction. Accordingly, the leading end of the film is separated from the roll by the stripper finger and is delivered out of the cartridge through a narrow guide path defined between a portion of the stripper belt and an adjacent edge of the stripper finger.

As the leading end of the film emerges beyond the path defined between the stripper belt and the stripper finger, it enters a curved guide channel established between stationary film guide member 31 and movable snubber member 32, which is pivotable downwardly about pin 33 but biased temperarily into firm resilient engagement with the guide member during the stripping and threading operation. This curved guide channel directs the leading end of the film downwardly into engagement by the film advancing mechanism of the projector, whereby it is advanced intermittently past a projection position aligned with the projector's optical system. Beyond the film gate, the leading end of the film proceeds into a pivotally supported channel member 34 which delivers it into contact with the hub of take-up reel 16. As is well known in the projector art, the hub of the take-up reel is provided with a plurality of teeth adapted to engage the edge perforations in the film, whereby the film is automatically attached to the hub upon being brought into contact therewith.

When the film has been engaged by the film advancing mechanism, its presence at a predetermined location is detected by an appropriate sensing device which then allows ear 26 to return to its initial position, thereby initiating the projection phase of the operating cycle. This causes the stripper finger and the stripper belt members to retract from the cartridge to their respective positions shown in FIG. 1 and releases the snubber member for downward pivotable movement about pin 33 against the influence of leaf spring 35, so that the snubber thereafter serves to stabilize the film tension between the gate and the supply reel in the manner well known in the prior art.

As the film is being projected, it can be stopped and displayed in reverse by manually moving control lever 36 from its illustrated raised (forward) position to an extreme downward (reverse) position. Additionally, the projector is provided with a review mechanism by means of which the operator can rewind and then reproject any desired portion of the film by manually moving control lever 37 to a rearward position to temporarily actuate the film rewinding mechanism.

The inner end of the roll of film 24 on the film supply spool within the magazine is attached to the core of the spool. Therefore, when all of the available film has been unwound from the cartridge, the resulting tightening of the film between the gate and the spool causes the snubber member to pivot downwardly to a position in which trigger lever 38 is engaged and depressed by shoe member 39 on the snubber member. Such depression of the trigger member initiates the rewind phase of the projector's operating cycle by opening the gate and withdrawing the film pull-down claw therefrom, by re-establishing positive rewinding rotation of drive member 18, and by releasing drive member 14 from the corresponding pulley member to allow the take-up reel to rotate freely as film is unwound therefrom. Thus, the film is automatically rewound entirely into the cartridge through the film gate, whereupon the rewound cartridge can be removed from the projector.

REEL MODE OF OPERATION

To convert the projector to accommodate a conventional film supply reel 40 on drive member 18, arm release ear 41 is moved forwardly against the resistance of spring 42, thereby withdrawing latch tooth 43 from opening 44 in the curved front wall member 45 of arm 21, (FIGS. and 20 21). Due to the location of ear 41, it is inaccessible whenever a cartridge is loaded onto the projector, thereby preventing the arm from being released from its lowered position until the cartridge has been removed. Upon releasing the latch, the arm can be moved to its previously described raised position where it is releasably retained by the reception of the latch tooth within a second opening 46 in wall member 45. Such movement of the arm automatically readjusts the film supply spindle assembly to stablish frictional engagement between drive member 18 and the related pulley member through a drive unit corresponding to the one employed with the take-up reel, whereby the torque applied to the drive member is proportional to the weight of reel 40 supported thereon.

Since the internal structure of the film cartridge comprises essential elements of the film stripping means described above, that mechanism is ineffective when supply reel 40 is mounted on drive member 18. Therefore, when the operator now depresses ear 26, the stripper finger and the stripper belt member remain in their respective inoperative positions shown in FIG. 1. However, a guide roller 47, which remained in the inoperative position shown in FIG. 1 during the above-described mode of operation, now moves automatically into contact with the constantly moving stripper belt 30. Thus, when the operator manually removes the leading end of the reel loaded film 48 from the supply reel and inserts it in the nip between the drive belt and the roller, the stripper belt serves to drive the film through the guide channel between guide member 31 and the temporarily immovable snubber member 32, whereby the end of the film is threaded through the gate and attached to the take-up reel as previously described. Upon release of ear 26, guide roller 47 retracts to its inoperative position and the snubber member is released so that the projection phase of the operation cycle can proceed, as related above.

During the projection of film 48, the projector can be adjusted manually by means of lever 37 to display the film either forwards or backwards. However, since the projector is not adapted to rewind the film through the film gate except when loaded with a film cartridge, the film review mechanism is rendered inoperative when the film supply spindle arm is in its raised position.

In this mode of operation, the film is not attached to the supply reel. Upon completion of the projection phase, there-fore, the trailing end of the filmstrip will have been separated from the film supply reel and wound onto the film take-up reel, and must be reattached manually to the supply reel in order to be rewound thereon. When this has been accomplished, the film supply spindle assembly is manually adjusted to establish positive driving connection between the film supply reel and the corresponding pulley member, thus causing the supply reel to rewind the film by overpowering the opposing torque frictionally applied to the take-up reel. When the rewinding operation has been completed, the supply spindle assembly is manually readjusted to reestablish the weight sensitive frictional engagement of the supply reel with the pulley member, whereupon the supply reel can be removed from the projector and replaced to prepare the projector for another operating cycle. If arm 21 is moved to its lower position to convert the projector to its cartridge mode of operation before the film supply spindle assembly has been thus manually readjusted, the lowering of the arm automatically accomplishes this result to insure proper subsequent functioning of the apparatus.

FILM CARTRIDGE AND MOUNTING MEANS

Figure 8:
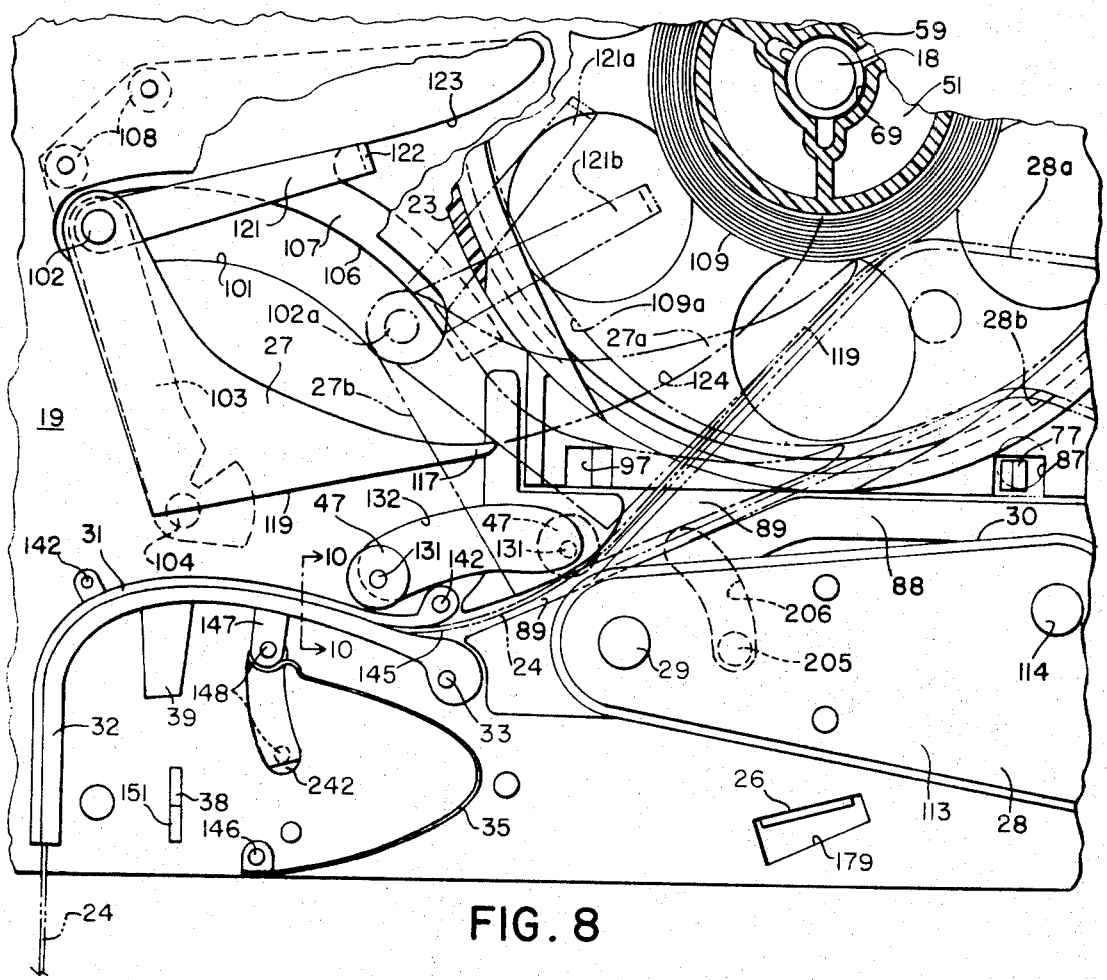
FIG. 8 corresponds to an enlarged portion of FIG. 1, partially cross sectioned and broken away and supplemented with phantom views to depict the positions of various elements of the film stripping and threading mechanism of the subject projector.

The illustrated film cartridge used with the subject projector is of the same general type disclosed in the above-identified pending U.S. Pat. applications Ser. Nos. 470,499, 643,502, and 643,503, and is supported in its loaded position by means disclosed and claimed in commonly assigned copending U.S. application Ser. No. 685,588, entitled Cartridge, filed in the name of John J. Bundschuh, on Nov. 24, 1967, now U.S. Pat. No. 3,648,952. As shown in FIGS. 4 and 8, such a cartridge comprises a lower body member 49 which cooperates with a removable top cover member 50 to define an internal compartment adapted to substantially enclose a film spool 51. From the generally flat base 52 of the cartridge, side walls 53 and 54 extend upwardly and join semi-cylindrical side wall members 55 and 56, which cooperate with the similarly curved top wall member 57 of the cover member to laterally enclose the film spool. As shown at 58, a vertical slot extends upwardly through the base portion of the cartridge and into the spool compartment to allow access to the film roll by the stripper finger and the stripper belt member. The trailing end of the strip of film wound onto the film spool is attached to the hub 59 thereof by means of a pin adapted to wedge the end of the film in a corresponding hole extending axially into the hub. The head of the pin, shown at 61, projects beyond the corresponding face of the film spool and into an enlarged opening 62 in the face of the cartridge viewed in FIG. 4. This feature of the illustrated cartridge is disclosed and claimed in commonly assigned copending U.S. application Ser. No. 685,597, entitled Cartridge and Reel Alignment Means, filed in the name of Arthur H. Crapsey on Nov. 24, 1967, now U.S. Pat. No. 3,491,965. Thus, the pin serves not only to attach the film to the reel hub, but also serves to insure proper orientation of the spool in the cartridge by virtue of the fact that it can be accommodated freely within opening 62, but not within the smaller opening 63 (FIG. 7) in the opposite end wall of the cartridge.

Referring now specifically to FIG. 4, it will be seen that the face of the cartridge adapted to be positioned adjacent the mechanism plate when the cartridge is in its loaded position is provided with a rib structure comprising a pair of parallel vertical ribs 65 and 66 extending outwardly from that face and joined by a similar transverse rib 66 partially encircling opening 62. The corresponding portion of the projector mechanism plate 19 is also illustrated in FIG. 4 and includes a recess 68 adapted to mate closely with the rib structure of the cartridge. Accordingly, when the cartridge is properly located in loaded position adjacent the mechanism plate, the cartridge rib struc-ture is received snuggly within the corresponding recess of the mechanism plate, thus laterally immobilizing the magazine and insuring that the film spool is centered therein when the axial bore 69 of the film spool is in mating engagement with drive member 18. At the bottom of recess 68 in the mechanism plate, a plurality of coplanar positioning pad members 71 are adapted to engage corresponding face surfaces of the cartridge rib structure to locate the loaded cartridge in parallel relation to the mechanism plate with the film spool in alignment with the film take-up reel and with other film engaging elements of the projector.

To releasably retain the cartridge in its loaded position, latch levers 72 and 73 are pivotally attached to the interior face of the mechanism plate by studs 74 and 75, as shown in FIG. 5. At their diagonally opposed ends, the latch levers define latch ears 76 and 77 extending through corresponding openings 78 and 79 in the mechanism plate. A spring 81 attached between the latch levers applies a resilient clockwise force to both levers (counterclockwise as viewed in FIG. 5), thereby urging the latch ears into overlapping relation to the adjacent portions of recess 68. As the cartridge ribs 65 and 66 enter recess 68 during the installation of the cartridge, the sloped end faces 82 and 83 of ears 76 and 77 are engaged respectively by correspondingly sloped face surfaces 84 and 85 of ribs 65 and 66, thereby camming the ears outwardly against the influence of spring 81. When the cartridge has been moved sufficiently to bring the rib structure into seating engagement with positioning pads 71, however, ears 76 and 77 are received respectively in corresponding cartridge openings 86 and 87 extending inwardly beyond ribs 65 and 66, thereby allowing the ears to be moved into latching engagement with the adjacent internal rib surfaces by spring 81, as shown in FIG. 6. Hence, it will be apparent that the cartridge is held in positive contact with the positioning pads by the latch ears and is prevented from moving laterally by the mating engagement of the cartridge rib structure with recess 68 in the cartridge plate.

FIG. 4 also depicts a rib member 88 extending forwardly from the mechanism plate and corresponding to the profile of the base portion of the cartridge. This structure serves to facilitate the alignment of the cartridge ribs with recess 68 during the cartridge loading operation and also provides a film guide channel 89. It should be noted, however, that the adjacent lateral surfaces of rib member 88 and the cartridge are spaced slightly apart when the cartridge is in loaded position to prevent interference with the accurate orientation of the cartridge by the reception of the cartridge ribs in recess 68.

To remove the cartridge from the projector, latch release ear 90 is manually depressed to rotate latch lever 72 in a counterclockwise direction, against the influence of spring 81, whereby the opposite end 91 of lever 72 displaces lever 73 in the same rotational direction by engagement with lip 92. Accordingly, both latch ears are withdrawn from latching engagement with the cartridge ribs, as shown in broken lines in FIG. 6.

Since the accurate location of the film cartridge relative to the projector is determined entirely by the cartridge rib structure rather than by peripheral surfaces of the cartridge, different cartridges with dissimilar peripheral dimensions can be employed without sacrificing accurate cartridge orientation. For example, FIG. 7 illustrates a profile of an alternate cartridge 93 that might be substituted for the one shown in FIGS. 4, et al., such cartridge being adapted to accommodate only a relatively small film spool. As represented in phantom lines, the face of cartridge 93 opposite the one illustrated is of course provided with locating ribs substantially identical to those of the cartridge shown in FIG. 4.

Since only two latch ears are provided by the latch mechanism illustrated in FIGS. 4, 5 and 6, it will be seen that sloped surfaces 94 and 95 and the corresponding cartridge openings 96 and 97 are superfluous to the particular arrangement depicted in FIGS. 4 and 5; these additional latching means being provided in the cartridge to allow its employment with projectors having additional or differently arranged latching ears.

FILM STRIPPING MECHANISM

The film stripping mechanism employed in the subject projector is of the same general type described in above-identified pending U.S. Pat. applications Ser. Nos. 470,499, 643,502 and 643,503, and embodies many of the novel features covered by these disclosures in combination with further improvements hereinafter described.

STRIPPER FINGER

As best illustrated by FIG. 12, et al., a sleeve member 100 extends horizontally from stripper finger 27 through slot 101 in the mechanism plate and is rotatably supported by elongate pin 102 on stripper arm 103, to allow pivotal movement of the finger about the axis of that pin. The stripper arm, in turn, is rotatably attached to the mechanism plate by stud 104. At the end of pin 102 opposite the stripper finger, a roller 105 (shown in FIGS. 11-13) straddles the arcuate lower edge 106 of cam plate 107 mounted on the mechanism plate by pedestals 108. This roller assists in maintaining arm 103 in parallel relation with the mechanism plate as the arm is rotated about stud 104 to move sleeve 100 along slot 101. By this arrangement, the stripper finger is also maintained in parallel relation with the mechanism plate and in alignment with the film roll 109 on the film spool within the loaded cartridge 23, and is movable into contact with the roll through cartridge slot 58.

STRIPPER BELT MEMBER

Figure 9:
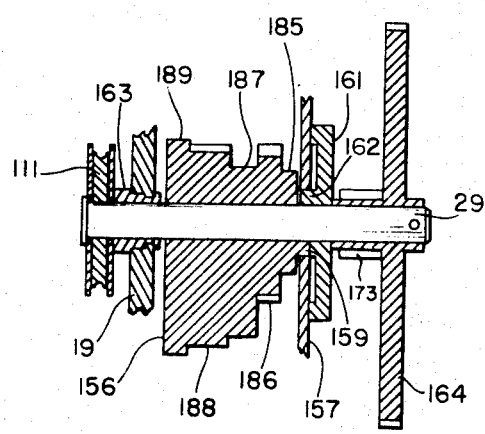
FIG. 9 is a cross sectional front view of the camshaft assembly employed to operate various elements of the projector.

As shown in FIGS. 9 and 12, the stripper belt member 28 includes a drive pulley 111 attached to the external end of shaft 29, which constantly rotates in a counterclockwise direction. The drive pulley is straddled by elongate side plates 112 and 113 vertically aligned with the cartridge film roll and pivotally supported at one end by rotating shaft 29. Between the side plates, two idler pulleys, not shown, are rotatably supported by studs 114 and 115 (FIG. 1). The stripper belt 30 comprises a resilient endless loop which is trained around the three pulleys and extends beyond the upper edges of the side plate. This belt, therefore, is constantly driven by the drive pulley and is movable into driving engagement with the film roll by angular movement of the entire stripper belt member about shaft 29.

STRIPPING OPERATION

When stripper arm 103 has been moved to its operative position in response to depression of ear 26, by the control mechanism which will be separately described in detail, pin 102 is located as shown at 102(a). Therefore, the engagement of tooth 117 of the stripper finger with the periphery of the film roll by means of spring 118 causes the stripper finger 27 to assume an operative positive determined by the size of the film roll. Similarly, when the same control mechanism pivots stripper belt member 28 upwardly into resilient contact with the film roll, its operative position will also be determined by the size of the film roll. For example, in FIG. 8, a relatively small film roll is illustrated in solid lines at 109, with the periphery of a larger roll being represented by broken line 109(a). In like manner, the respective operative positions of the stripper finger and the stripper belt member in engagement with roll 109 are shown in broken lines at 27(a) and 28(a), with the corresponding positions of the same members engaged with roll 109(a) being depicted at 27(b) and 28(b). From this illustration, it is apparent that the lower edge 119 of finger 27 is generally tangential to the film roll and in spaced substantially parallel relation to the adjacent portion of the stripper belt, regardless of the size of the film roll. Thus, as the roll is driven in a clockwise direction by the belt, the leading end of the film is separated from the roll by the tooth of the stripper finger and is driven into guide channel 89 along a path established between the belt and the adjacent lower edge of the stripper finger. Due to the close adjacency of the edge of the stripper finger to the belt, this film path is sufficiently narrow to prevent buckling and possible damage to the film therealong in the event that the movement of such film is blocked at some point beyond that path.

CAM PLATE

In moving from its inoperative position to an operative position as shown at 27(a) or 27(b), the stripper finger must be rotated in counterclockwise relation to stripper arm 103 about the axis of pin 102 by spring 118. However, it should also be apparent that the tooth of the stripper finger must not initially engage the film roll at an angle that would block movement of the finger to its operative position. Also, the path of movement of the finger must be such as to avoid interferring engagement with adjacent members of the projector, e.g. with guide roller 47. To meet these requirements, a cam follower arm 121 is attached to sleeve 100 in fixed angular relation to the stripper finger and includes a cam follower lip 122 adapted to engage curved edge surface 123 of cam plate 107 under the influence of spring 118. Thus, the cooperation of lip 122 with curved cam surface 123 determines the counterclockwise rotation of the stripper finger relative to the stripper arm in accordance with the angular position of the stripper arm during its rotational movement about stud 104. Consequently, prior to engagement with the film roll, the tooth of the finger member follows the path shown in broken lines at 124. Accordingly, regardless of the size of the film roll, it is encountered by the tooth at an angle such that further movement of the stripper arm can move the finger into its operative position by sliding the tooth along the film roll at an acute angle thereto.

During the sliding movement of the tooth along the roll, the tooth is rotated in clockwise relation to the stripper arm against the influence of spring 118. As a result, the cam follower arm is also pivoted away from cam surface 123 to a position as illustrated at 121(a) or 121(b), thereby allowing the tooth to be maintained in firm resilient contact with the film roll without interference from the cam arrangement.

GUIDE ROLLER

Guide roller 47 is rotatably supported in alignment with stripper belt member 28 by a shaft 131 extending through an acru-ate slot 132 in the mechanism plate as shown in FIG. 8. Shaft 131, in turn, is attached to a roller lever 133, shown in FIGS. 11–15, which is pivotally supported by pivot stud 134. Accordingly, the roller is movable between an inoperative and an operative position, as shown respectively in solid and broken lines in FIG. 8, in response to corresponding movement of lever 133 by the hereinafter described control mechanism.

When the projector is loaded with a film cartridge, the corresponding lowered position of arm 21 automatically causes the roller to remain in its inoperative position, in which it is located out of the movement path of the stripper finger. However, when arm 21 is raised to convert the projector to its reel mode of operation, the stripper finger and the stripper belt member are disabled from moving from their respective inoperative positions and the roller is allowed to move to its operative position in response to depression of ear 26. In this position, the roller is resiliently engaged with moving stripper belt 30, so that the manual insertion of the end of the film 48 on the supply reel into the nip of roller 47 and belt 30 causes the film to be driven into guide channel 89 by the belt, until the roller is subsequently returned to its inoperative position by the control mechanism upon upward movement of ear 26.

FILM GUIDE AND SNUBBER

Figure 10:
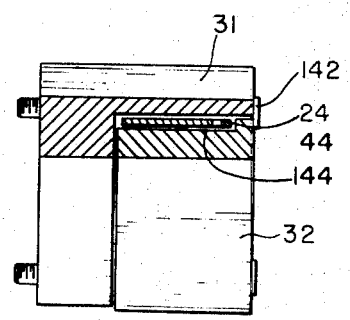
FIG. 10 is an enlarged cross sectional view of the film guide and snubber structure shown in FIG. 8, taken along the line 10—10 of that Figure; 7

Still referring principally to FIG. 8, it will be seen that film guide member 31 is rigidly attached to the exterior surface of the mechanism plate by rivets 142 and pivotally supports snubber member 32, which is attached to the guide member by pivot pin 33. As shown in FIG. 10, the respective lower and upper surfaces of the guide member and the snubber member cooperate to define a film guide passageway 144 when the snubber is pivoted upwardly against the guide member, as illustrated. At the end of these two members adjacent film guide channel 89 on the mechanism plate, the surfaces defining the film passageway diverge to form a tapered throat 145, in alignment with that channel. Accordingly, as the leading end of the film emerges from the guide channel under the influence of the stripper belt, it is pushed through passageway 144, and thereby delivered downwardly into the film gate.

Leaf spring 35 is attached to the mechanism plate by a rivet 146 and bears upwardly against lug 147 on the snubber member to resiliently urge the snubber member into its depicted position adjacent guide member 31. Thus, during the projection of the film, the snubber member serves to stabilize the tension of the portion of film between the film gate and the supply reel or spool by moving downwardly against the influence of spring 35 in response to momentary increases in such tension; similar devices being well known in the projector art. To be effective for this purpose, however, the snubber member must be capable of being pivoted away from the guide member quite easily. For that reason, the upward force exerted on the snubber by spring 35 is insufficient to insure that the snubber will remain in contact with the guide member to preserve the closed passageway as the film is being fed therethrough by the stripper belt. Therefore, lug 147 is provided with a pin 148 extending through arcuate slot 149 in the mechanism plate so that a snubber blocking lever incorporated in the control mechanism can engage the inner end of that pin to resiliently retain the snubber member temporarily in its raised position under the influence of a much stronger spring. Alternatively, the invention could of course be embodied in a projector of the well-known type in which the film movement is controlled by one or more sprocket members in which case the snubber member would not be needed as a tension regulating device and could remain in its raised position.

FIG. 8 also illustrates the previously mentioned shoe member 39 extending downwardly from the snubber member above trigger lever 38, which projects through slot 151 in the mechanism plate. The purpose of this show is to depress the trigger lever to initiate the film rewinding phase of operation when the snubber member is moved to its lowermost position by the increase in film tension accompanying withdrawal of all of the available film from the film magazine loaded onto the projector.

CAM CONTROL MECHANISM

CAM DRIVE MEANS

The cam control mechanism of the subject projector is illustrated in detail in FIGS. 9 and 12 – 15. The central element of this mechanism is shaft 29, which extends freely through the bore of a multiple lobe cam member 156 located between the mechanism plate and support plate 157. The support plate is mounted rigidly to the mechanism plate by pedestals as indicated at 158 in FIG. 12 and rotatably supports sleeve portion 159 of the cam member, which is keyed to disk member 161 beyond the support plate by a drive key shown at 162. At the opposite end of the cam member shaft 29 is rotatably supported in the mechanism plate by bushing 163 attached to elongate side plate 112 of the stripper belt member 28. At the external end of the shaft, belt drive pulley 111 is attached thereto between the side plates 112 and 113 of the stripper belt member, as shown in FIG. 12.

Throughout the operation of the projector, shaft 29 is rotated constantaly in a counterclockwise direction by spur gear 164 attached to the internal end of the shaft and meshed with a smaller spur gear 165 rotatably supported on stub shaft 166 and driven by pulley 167 through a drive belt mechanism described below with reference to FIGS. 20 and 21.

To rotate the cam member intermittently with shaft 29, a dog member 168 is pivotally mounted to disk member 161 by a pin 169 and is biased by spring 171 to urge dog ear 172 toward engagement with the multiple toothed peripheral surface of hub member 173 of gear 164, as best illustrated by FIGS. 11 and 12. Thus, when the dog ear is received between two of the teeth of the constantly rotating hub member 173, the cam member is coupled positively to shaft 29 for rotation therewith.

In order to engage and disengage the cam member from shaft 29, a clutch operating lever 174 is pivoted to support plate 157 by pin 175 and is urged upwardly by spring 176 to bias lower lever ear 177 into contact with the periphery of disk member 161. In this position, lever ear 177 is adapted to be engaged by lip 178, which extends beyond disk 161 from dog member 168, thereby holding dog ear 172 out of engagement with hub member 173 and allowing the cam to remain at a stationary initial position as shaft 29 rotates. When ear 26 is depressed manually to the bottom of mechanism plate opening 179, however, ear 177 is moved downwardly beyond lip 178 as the upper lever ear 180 simultaneously moves downwardly into contact with disk 161 as shown in broken lines in FIG. 11. Accordingly, the dog member immediately pivots about pin 169 under the influence of spring 171 to engage ear 172 with hub member 173, thereby coupling the cam member to shaft 29. As soon as the cam has rotated through an angle of approximately 120° however, the corresponding rotation of disk 161 brings lip 178 into contact with lever ear 180, whereupon the cam member is again immobilized at its intermediate position by the disengagement of the dog ear from the hub member. As shown at 181, a spring loaded pivotal latch member is adapted to retain lever 174 temporarily in its depressed position by engaging upper lever ear 180, thus casing the cam member to remain at its intermediate position until the latch member is released from ear 180 by solenoid 182. The solenoid, in turn, is connected to an appropriate power source, not shown, through a normally open swithc device 183 (FIGS. 16 and 17) provided with a sensing finger 184 extending into the film gate to close the switch in response to the presence of film within the gate. Therefore, lever 174 remains in its lower position until the film has been fed into engagement with the projector's film advancing mechanism, whereupon latch member 181 is released from ear 180. When this occurs, lever 174 is returned to its raised position by spring 176, whereby the disengagement of ear 180 from lip 178 again temporarily engages the cam member to shaft 29 to restore the cam and clutch members to the initial condition shown in FIG. 11.

CAM MEMBER

Cam member 156 comprises a cylindrical hub 185 concentric with the bore of the cam member at one end thereof, and four differently profiled cam lobes; namely, stripper finger lobe 186, reset lobe 187, roller and snubber lobe 188, and stripper belt lobe 189. The respective profiles of these lobes are shown in FIG. 13 with the cam member illustrated in its initial position, and it will be understood that the lobes remain at all times in the same angular relation to one another. The reasons for the particular illustrated profiles of the different lobes will be apparent from subsequent explanations of the functions performed by the cam member. However, it should be noted that by changing the lobe profiles, the cam member could be adapted to be rotated through each complete revolution in two successive angular movements of other than 120° and 240°, such angles having been chosen somewhat arbitrarily to reduce the maximum torque required to rotate the cam member from that which would be needed if the cam were rotated successively through more nearly equal angles.

FILM STRIPPER

The operation of stripper finger 27 is controlled by the cam control mechanism through slide bar 191, which is supported at one end by legs 192 and 193 slidably straddling cam hub 185, and at its opposite end by an L-shaped ear 194 extending beyond lip 195 and received through hole 196 in stripper arm 103. Cam follower ear 197, located between the legs of the slide bar is adapted to engage the periphery of stripper finger lobe 186, and is urged toward the cam by a spring symbolically represented at 198. (For purposes of clarity, spring symbols corresponding to the one shown at 198 are employed in the accompanying drawings to represent springs acting in various directions, as indicated by the arrowhead of each such symbol, but such symbols do not necessarily indicate the positions or types of springs best adapted to produce the forces thereby illustrated.)

A stripper belt control lever 199 is pivoted to the mechanism plate by pivot stud 201 and is provided with a cam follower ear 202 biased toward engagement with the stripper belt lobe 189 of the cam member by a spring 203. At the end of lever 199 adjacent the cam member, the lever is provided with a slot 204. This slot receives the end of a stud 205, which is rigidly attached to the side plate of the stripper belt member adjacent the mechanism plate and extends through the mechanism plate via an arcuate slot shown in broken lines at 206 in FIG. 8.

When the cam member is in its initial position, slide bar 191 and lever 199 are located as shown in FIG. 13 by the resilient engagement of their respective cam follower ears with the corresponding cam lobes, thereby maintaining the stripper finger and the stripper belt member in their inoperative positions as represented in solid lines in FIG. 8.

Figure 14:
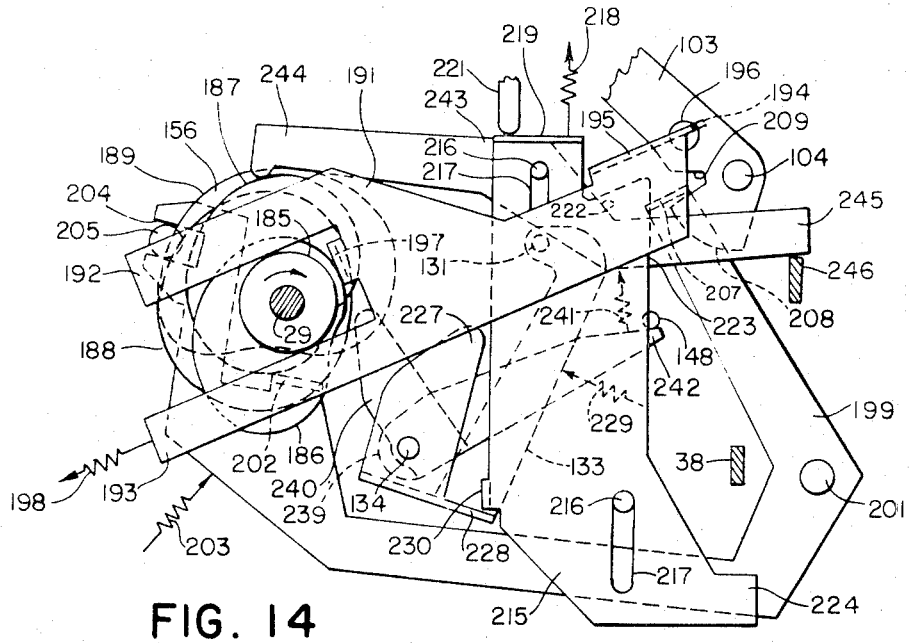
FIG. 14 corresponds to FIG. 13 and shows the relative positions of the illustrated elements during the film stripping and threading phase of the operating cycle with the projector adapted to accommodate a film cartridge.

Upon manual depression of ear 26, the cam member revolves to its intermediate position. Accordingly, as shown in FIG. 14, slide bar 191 effects movement of the stripper finger to its operative position as cam follower ear 197 is maintained in contact with cam lobe 186 by spring 198. During such movement of the cam member, cam lobe 189 also presents a decreasingly smaller radius to cam follower ear 202 of lever 199. At the opposite end of that lever, an ear 207 thereon is in alignment with the curved edge surface 208 of stripper arm 103. Therefore, as the cam member commences its rotational movement from its initial position, lever 199 is blocked by the engagement of ear 207 with surface 208, allowing cam lobe 189 to move out of engagement with cam follower ear 202. By the time the cam member reaches its intermediate position, however, the movement of stripper arm 103 by slide bar 191 has brought the stripper finger to its operative position and has aligned notch 209 in the stripper arm with ear 207. Thus, since ear 207 is no longer blocked, spring 203 can now pivot the slotted end of lever 199 upwardly, to thereby rotate the stripper belt member about shaft 29 and into resilient driving engagement with the film roll on the carriage spool. By incorporating this feature, the present invention therefore further assures proper functioning of the film stripping mechanism by avoiding film unwinding rotation of the film roll by the stripper belt until the stripper finger is operatively positioned in engagement with the roll.

SELECTOR SLIDE

Selector slide 215 is supported for vertical sliding movement by stationary pins 216 extending through slots 217 in the slide and is biased upwardly by a relatively strong spring 218. As long as arm 21 is latched in its lower position to allow the projector to accommodate film cartridges, the slide plate is also retained in its lower position, as shown in FIGS. 11 – 14, against the influence of spring 218, by the engagement of slide lip 219 by abutment finger 221 attached to the movable arm 21. When arm 21 is raised, however, spring 218 moves the selector slide upwardly to the position shown in FIG. 15, defined by by the engagement of pins 216 with the lower ends of slots 217.

Figure 15:
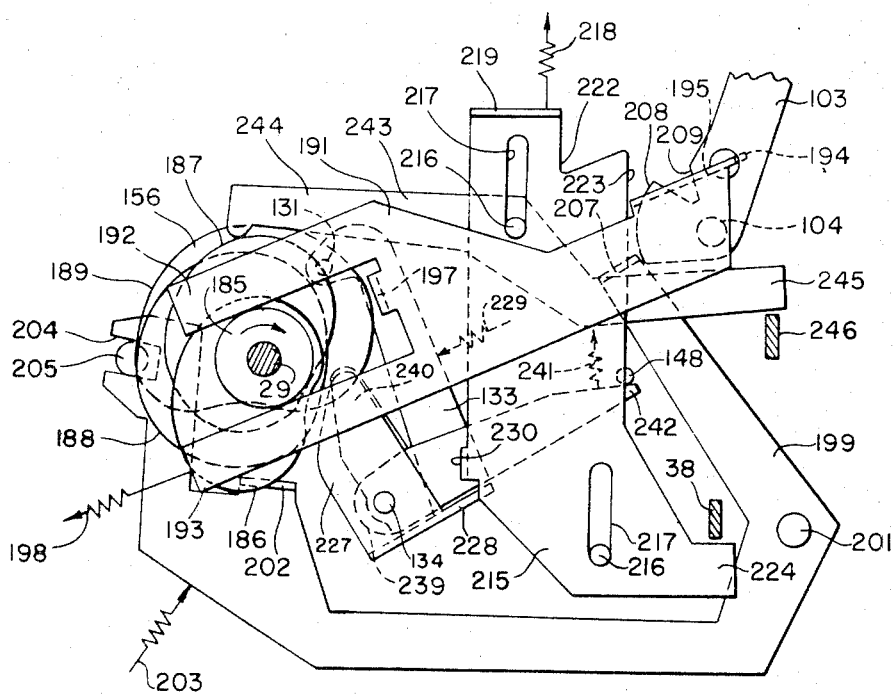
FIG. 15 corresponds to FIGS. 13 and 14 and shows the relative positions of the illustrated elements during the film stripping and threading phase of the operating cycle with the projector adapted to accommodate a film supply reel.

As long as the selector slide is in its lower position, a notch 222 in the slide is adapted to receive lip 195 of slide bar 191 as that bar moves to the position shown in FIG. 14 to operate the film stripping mechanism. When the selector plate is raised as shown in FIG. 15, however, notch 222 is above the path of movement of lip 195. Therefore, as the cam member rotates from its initial position to its intermediate position, lip 195 encounters edge surface 223 of the selector slide, which blocks further movement of the stripper finger from its inoperative position by preventing cam follower ear 197 from being retained in contact with cam lobe 186 by spring 198. Additionally, since lever 199 cannot rotate about pivot stud 201 to move the stripper belt member into operative position until arm 103 has pivoted sufficiently to align notch 209 with ear 207, which cannot occur as long as slide bar lip 195 is blocked by the selector slide, it is apparent that the stripper belt member also remains in its inoperative position.

The position of the selector slide also determines the operativeness of guide roller 47 by allowing the roller to move from its inoperative position to its operative position only when the projector is in the reel mode of operation. This is accomplished by means analogous to those just described, as will be hereinafter explained in connection with describing the roller positioning elements of the control cam mechanism.

For reasons later explained, the projector is adapted to rewind film through the film gate only when loaded with a film cartridge. Therefore, still another function of the selector slide is to prevent the initiation of the cartridge rewinding phase of the projector cycle except when arm 21 is positioned to accommodate a film supply cartridge. This function is performed by providing the selector slide with a lateral ear 224 extending beneath trigger lever 38. During the cartridge mode of operation, ear 224 is below the lowermost position of the trigger lever defined by slot 151 in the mechanism plate, as shown in FIG. 13, and therefore has not effect on the operation of the trigger. In the reel mode of operation, however, the raised position of the selector slide illustrated in FIG. 15 locates ear 224 in overlapping relation to the lower portion of slot 151 immediately below the trigger lever so that the trigger can be depressed only by a force sufficient to overcome the heavy spring 218 urging the selector slide upwardly. Since the film advancing mechanism is incapable of applying sufficient tension to the film to produce such a force on the snubber member, the trigger member is thus rendered inoperable by the snubber member. Although the trigger could still be released manually, such an operation could not be performed accidentally due to the substantial resistance of spring 218.

GUIDE ROLLER

Guide roller lever 133 is pivotally supported by stud 134 attached to the mechanism plate and is provided with a cam follower ear 227 extending upwardly from the base member 228 of the lever and urged toward engagement with cam lobe 188 by spring 229. When the cam member is in its initial position, the engagement of ear 227 with lobe 188 displaces lever 131 against the influence of spring 229, as shown in FIG. 13, whereby roller 47 at the top end of the lever is located at its inoperative position depicted in solid lines in FIG. 8.

If selector slide 215 is in its lower position, i.e., during the cartridge mode of operation, a blocking ear 230 on the selector slide is disposed immediately above base member 228 of the lever, as illustrated in FIG. 13. Consequently, during rotation of the cam member, the roller is maintained in its inoperative position by the engagement of the lever base member with blocking ear 230, as shown in FIG. 14, while the stripper finger and the stripper belt perform the film stripping operation. Conversely when the projector is adjusted to the reel mode of operation, the corresponding raised position of the selector slide removes blocking ear 230 from the path of movement of base memer 228, allowing cam follower ear 227 to follow cam lobe 188 under the influence of spring 229. Accordingly, the roller moves into resilient contact with the stripper belt as the stripper belt member and the stripper finger are retained in their respective inoperative positions by the selector slide.

During either type of threading operation, it is of course essential that the film advancing mechanism be adjusted to its forward projection condition so that the film will be engaged by that mechanism and thereby moved away from rather than toward the supply roll. Therefore, an interlock device is employed to prevent ear 26 from being depressed unless control lever 36 is in its raised (forward) position. As illustrated in FIGS. 11, 16 and 20, this device comprises a cam slide 231 slidably supported for vertical movement of studs 232. At its lower end, the cam slide is bifurcated as shown at 233 to straddle the adjacent end of control lever 36 so that the vertical position of the slide plate corresponds to the position of the control lever. A blocking slide 234 is similarly supported for horizontal sliding movement by studs 235 and is biased rearwardly by a light spring 236 to maintain the rearward end of the blocking slide in contact with cam surface 237 along the adjacent edge of the cam slide. Accordingly, as long as control lever 36 is in its raised (forward) position, its blocking slide is located as shown in solid lines in FIGS. 11 and 20, with its upwardly extending leg 238 behind the path of movement of ear 26. Upon movement of control lever 36 to its lower (reverse) position, however, the corresponding movement of the cam slide brings the sloped upper portion of cam surface 237 into engagement with the blocking slide, thereby camming the latter slide forwardly to position leg 238 directly below ear 26 as shown in broken lines in FIGS. 11 and 20. Consequently, it will be apparent that leg 238 prevents downward movement of the ear so long as the projector is adjusted for reverse projection, thus povitively eliminating the employment of the threading mechanism until lever 36 is returned to its raised position.

SNUBBER

As previously described, snubber member 32 is pivotable downwardly from film guide member 31 about pivot pin 33 against the resistance of a relatively weak leaf spring 35, but is held in contact with the guide member under a substantially stronger resilient force during the film threading operation. This is accomplished by means of snubber blocking lever 239, which is pivotally mounted on stud 134 and provided with cam follower ear 240 aligned with cam lobe 188. A relatively strong spring 241 biases the rearwardly projecting arm 242 of lever 239 in an upward direction, thereby maintaining cam follower ear 240 in constant engagement with cam lobe 188.

When the cam member is in its initial position, arm 242 is depressed against the resistance of spring 241 to the location shown in FIG. 13. In this position, the arm is vertically aligned with pin 148 extending form the snubber member through the mechanism plate, but is below the lowermost position of that pin as shown in broken lines in FIGS. 8 and 13. Consequently, the snubber blocking lever in no way influences the movement of the snubber member produced by variations in film tension. Whenever the cam member is rotated to its intermediate position, however, arm 242 is raised into engagement with pin 148 as shown in FIGS. 14 and 15, thereby resiliently biasing the snubber member against film guide member 31 under the combined forces of the relatively weak leaf spring 35 and the substantially stronger spring 241.

RESET LEVER

As will be described below in detail, the depression of trigger lever 38 releases a latched spring loaded mechanism to initiate the cartirdge rewinding phase of the projector's operating cycle. Therefore, still another function performed by the cam member is to reset that mechanism during the subsequent film stripping operation in preparation for another operating cycle.

To perform this resetting operation, reset lever 243 is centrally supported for pivotal movement by the upper selector slide support pin 216, with the forwardly extending leg 244 of the lever located directly above cam lobe 187. The rearwardly extending leg 245 of the same lever projects above the adjacent end of the cocking arm 246 illustrated in detail in FIGS. 16 – 18 and shown in cross section in FIGS. 13 – 15.

For purposes of understanding the operation of the reset lever, it will be understood that the end of the cocking arm below the reset lever is resiliently biased to the position shown in cross section in FIGS. 11 and 13; and that the spring loaded mechanism is reset by depressing the lever to the position shown in cross section in FIGS. 14 and 15 and then allowing it to return to its former raised position. Accordingly, as the cam member rotates from its initial position to its intermediate position, the periphery of cam lobe 187 causes the rearwardly extending leg 245 of the reset lever to move downwardly with sufficient force to depress the cocking arm. Thereupon, as the cam member continues to rotate through the remainder of a single revolution, the radius of cam lobe 187 engaged by leg 244 decreases, allowing the reset lever to be restored to the position shown in FIG. 13. During th projection of the film on a film supply reel, the spring loaded mechanism cannot be released due to the fact that the trigger member is automatically disabled by the selector slide. Therefore, since the spring loaded mechanism remains cocked, the subsequent downward and upward movement of the reset lever serves no useful purpose, but need not be prevented inasmuch as it cannot interfere with the operation of the projector.

FILM GATE ASSEMBLY

GATE AND FILM ADVANCING STRUCTURE

The film gate assembly of the subject projector is depicted by FIGS. 16 – 20, with various elements of the assembly having been omitted in different figures for purposes of clarity. Viewed collectively, FIGS. 16, 17 and 20 illustrate the overall construction of this assembly, including the film advancing mechanism and the structure employed to open the gate during a cartridge rewinding operation.

From the three above-mentioned figures, it will be seen that the film gate, as such, comprises a stationary gate member 251 rigidly supported by vertical support plate 252 and defining a vertical channel structure 253 extending downwardly from a rearwardly sloped film guide lip 254. A movable gate member 255 includes a channel portion 256 extending downwardly from a forwardly sloped film guide lip 257 and adapted to mate loosely within channel structure 253 to define a vertical film passageway shown at 258 in FIG. 17. Except during the cartridge rewinding operation, the film within this passageway is resiliently sandwiched between the surfaces of the gate members adjacent thereto under the influence of springs 259, which bias the movable gate member in a rearward direction. As illustrated in FIG. 20, the film gate is positioned with diverging film guide lips 254 and 257 located directly below the lower end of the guide channel defined between film guide member 31 and snubber member 32, so that the leading end of the film emerging from that channel during the film threading operation is guided into passageway 258 between the gate members. Similarly, the open throat portion 260 of lower film guide member 261 is located directly below film passageway 258 to receive the end of the film as it emerges from the gate, thereby causing the film to be further guided into throat 262 of channel member 34, through which it is delivered to the hub of the take-up reel. As shown at 263, a snubber shoe is adapted to resiliently engage the film along the adjacent curved portion of lower guide member 261; the principal function of this shoe being to control the film tension between the gate and the take-up reel during reverse projection of the film.

In FIG. 16, it can be seen that a projection aperture 265 is provided in the movable gate member along the film passageway and merges into vertical claw receiving slots 266, extending above and below the aperture. Corresponding aligned openings, not shown, are of course also provided in the stationary gate member, thereby defining a film projection location along the axis of the projector's optical system represented by projection lamp 267 and lens 268.

The film advancing mechanism of the projector is generally similar to the one descirbed in commonly assigned pending U.S. Pat. application Ser. No. 648,282, entitled "Film Pull Down and Control Mechanism For a Motion Picture Projector," filed in the name of Thomas G. Kirr on June 23, 2967, now U.S. Pat. No. 3,463,372. In this mechanism, a claw plate 271 is mounted to support plate 252 between ball bearings shown at 272, which provide for vertically oriented up and down movement of the claw plate while also defining a vertical pivot axis about which film claws 273 can move into or out of the claw receiving slots in the gate members. Behind the claw plate, rotary shutter blade 274 and cam member 275 are attached to shaft 276 of drive motor 277, which constantly rotates in a counter-clockwise direction. A cam follower roller 278 projects rearwardly from the claw plate and is urged downwardly into contact with the peripheral cam surface 279 of the cam member by a spring 281, whereby that cam surface imparts predetermined vertical movement to the claw plate. The face of the cam member is provided with two concentric cam surfaces 282, and 283, of different configurations. A cam follower pin 284, slidably supported by bushing 285 in control lever 36 is adapted to be aligned selectively with either of the two cam surfaces by moving the externally accessible end of the control lever shown in FIGS. 1 and 3 to either its raised or its lower position, thereby pivoting the lever about stationary pivot stud 286. The flat rearwardly facing surface of the claw plate adjacent the front end of the cam follower pin is rocked rearwardly into resilient contact with the pin by spring 287. Accordingly, the rotation of the cam member causes claws 273 to move both vertically and into and out of engagement with the performations in the film within the gate passageway. By virtue of the configurations and phase relationships of cam surfaces 279, 282 and 283, movement of the control lever to its raised position causes the film to be advanced downwardly through the gate for normal projection, whereas moving the lever to its lower position causes the film to be displayed in reverse as it is moved upwardly through the gate by the claws. The pending patent application just referred to also disclosed means for enabling this type of film advancing mechanism to be adjusted to a "still" projection condition in which a single film frame may be projected as long as desired; and it should be apparent that such a feature could be incorporated readily into a projector embodying the present invention.

GATE OPENING MECHANISM

During the cartridge rewind operation, the film is rewound into the film cartridge through the film gate. Therefore, it is essential that the gate be open during this operation, i.e., that the film claws be retracted and that the movable gate member be moved out of intimate resilient contact with the film. For this purpose, cam finger member 291 is mounted to support plate 252 by studs 292 extending through corresponding slots 293 in fingers 294 and 295, thereby allowing lateral movement of the cam finger member between its retracted position shown in FIGS. 16 - 18 and its operative position shown in FIG. 19. The cam finger member is biased toward its operative position by a spring wire 296 extending between finger ears 297 and bowed about stationary pin 298 attached to the vertical support plate.

Except during a cartridge rewinding operation, the cam finger member is retained in its retracted position by a latch member 299, pivotally mounted to latch support bar 301 by pin 302 and urged into latching engagement with lip 303 of the cam finger member by spring 304. The latch support bar is pivotable about stationary stud 305 but is biased into contact with a fixed abutment member 306 by spring 307 with sufficient force to overcome the opposite influence of spring wire 296.

As long as the cam finger member remains in its retracted position, the rearwardly slanted cam tongues 308 and 309 at the ends of fingers 294 and 295 are in spaced parallel relation to corresponding forwardly slanted tongues 311 and 312 of the movable gate member, but are not in contact with the latter tongues. Similarly, a rearwardly slanted tongue 313 at the end of claw disabling finger 314 of the cam finger member is positioned in adjacent parallel relation to the corresponding sloped edge portion 315 of claw plate 271, beyond engagement therewith.

Trigger lever 38 is pivoted on stationary stub 316 with the end of the lever below snubber shoe member 39 biased upwardly by spring 317. A connecting link 318 is pivotally attached to the opposite end of lever 28 by pivot stud 319, and extends downwardly therefrom behind depending leg 321 of cocking arm 246. A light spring 322 biases the connecting link toward ear 323 of the cocking arm, whereby that ear is received between link tongues 324 and 325, to limit vertical movement of the link. As long as the trigger lever is raised and the cam finger member is retracted, the lower tongue 325 of the connecting link is positioned below horizontal ear 326 of the latch member. When the trigger lever is depressed, however, either manually or by the snubber shoe member, the resulting upward movement of tongue 325 lifts latch ear 326 to disengage latch member 299 from lip 303 of the cam finger member, whereupon that member is moved immediately to its operative position by a spring wire 296. Accordingly, the forward displacement of gate member tongues 311 and 312 by finger tongues 308 and 309 pivots the movable gate member forwardly about a vertical axis defined by the engagement of fulcrum edges 327 of movable gate ear 328 with the adjacent concave surface 329 of the stationary gate member, thereby moving the channel portion of the movable gate member out of intimate contact with the film in the gate. Concurrently, tongue 313 at the end of claw disabling finger 314 displaces the sloped edge portion 315 of the claw member forwardly to a position at which claws 273 are entirely retracted from the film gate passageway regardless of the rotational position of cam member 275. While the cam finger member remains in its operative position, therefore, the film gate remains open to allow free movement of the film therethrough. In addition, a movable film edge guide member of the type known in the projector art obviously could also be retracted in response to such movement of the cam finger member, to thereby increase the width of the film passageway during the rewinding operation.

The previously mentioned cocking arm 246 is pivotally supported by fixed stud 331 and is urged by a light spring 332 to a position in which it is engaged with the lower edge of reset lever 243. Except during the operation of the control cam mechanism, the cocking arm is located with its depending leg 321 in a vertical position, whereby reset ear 333 extending from leg 321 is maintained beyond the path of movement of connector bar 334 of the cam finger member. When the cocking arm is rotated about pivot stud 331 by downward movement of the reset lever, however, ear 333 engages the connector bar and returns the cam finger member to its retracted position. Before this operation occurs, the trigger lever has presumably been released, allowing the latch member to return to a horizontal position. Therefore, as lip 303 of the cam finger member encounters the sloped edge surface 335 of the latch member, the latter member is cammed upwardly to allow the lip to pass and then returns into latching engagement with the lip to hold the finger cam in its retracted position. Once this has been accomplished, the cocking arm has completed its function and returns to its former position, and thereafter, subsequent movements of the cocking arm by the reset lever will not influence the cam finger member unless that member has been returned in the meantime to its operative position.

The film review feature of the subject projector allows the operator to rewind the film into the cartridge at any time by moving the externally accessible end of review lever 37 rearwardly and holding it in that position until the desired amount of film has been rewound, thereby permitting any portion of the film to be displayed agian. To perform this operation, the review lever is pivotable in a horizontal plane about fixed pivot stud 341 and is provided with a forwardly facing tongue 342 received within a mating hole 343 at the top end of latch support bar 301. Thus, when the review lever is moved rearwardly, the latch support bar is pivoted toward the film gate against the resistance of the relatively heavy spring 307 which normally holds it in contact with fixed abutment member 306. Accordingly, the cam finger member is moved to its operative position by spring wire 296 while still latched to the latch support bar by latch member 299 in engagement with lip 303; thereby temporarily opening the gate. As soon as the review lever is released, however, the latch support bar is retuned to its former position by spring 307, thus restoring the gate to its closed condition as the cam finger member is retracted by the latch member against the influence of spring wire 296.

FILM TAKE-UP SPINDLE ASSEMBLY

Figure 22:
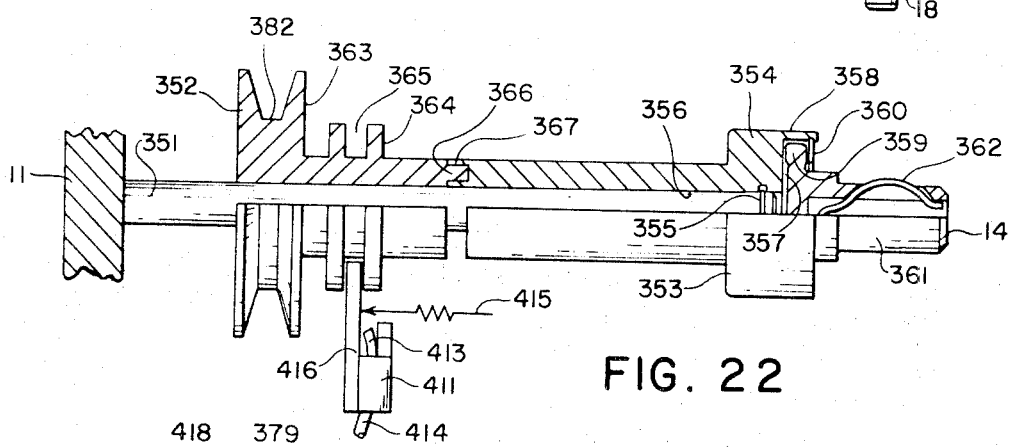
FIG. 22 is a partially cross sectional rear elevational view of the film take-up spindle assembly and of the shifter bar connected thereto.

As best illustrated by FIG. 22, the film take-up spindle assembly is supported by a nonrotatable horizontal shaft 351 rigidly attached at its left end to the projector casing member 11, and includes a rotatable pulley member 352 and a rotatable weight sensitive drive unit 353 comprising drum member 354 and reel drive member 14.

Referring first to the weight sensitive drive unit, drum member 354 thereof is freely rotatable on the shaft but is retained in a fixed axial position by an annular spring clip 355 received in a circumferential groove in the shaft and in a corresponding groove within the drum member bore 356. The drum member, in turn, is provided with a flat internal face surface 357 surrounded by a cylindrical wall member 358 to define a cylindrical receptacle adapted to freely accommodate flange 359 of the reel drive member, which is retained in place by an annular disk 360. Thus, the reel drive member is rotatable relative to the drum member, but only by overcoming the friction developed between the contacting surfaces of those two members. When a film reel is installed on the spindle stub 361 of the reel drive member, the weight of the reel tends to tilt the drive member out of alignment with the drum member, thereby increasing the friction encountered between the internal surfaces of the drum member and the surfaces of the flange in contact therewith during relative rotational movement between those two members. Therefore, when the film take-up reel is rotatably engaged with the spindle stub by resilient key member 362, it will be seen that the amount of torque transmittable from the drive member to the reel, or vice versa, is a function of the reel weight, which is partially determined by the amount of film wound thereon.

Pulley member 352 comprises a single sheave member 363 attached to a hub member 364 provided with an annular groove 365 by which the pulley is positioned axially along shaft 351 by a mechanism described later. At the right end of hub member 364, a lug 366 projects axially therefrom in alignment with a similar lug 367 projecting in the opposite direction from drum member 354 of the weight sensitive drive unit. As long as the pulley member is positioned axially as shown in FIG. 22, the two lugs are in engageable relation with one another, thereby coupling the film take-up reel to the pulley through the torque limiting weight sensitive drive unit. When the pulley is moved to the left, however, the lugs move apart to allow independent rotation of the pulley and the drive unit.

FILM SUPPLY SPINDLE ASSEMBLY

Figure 23:
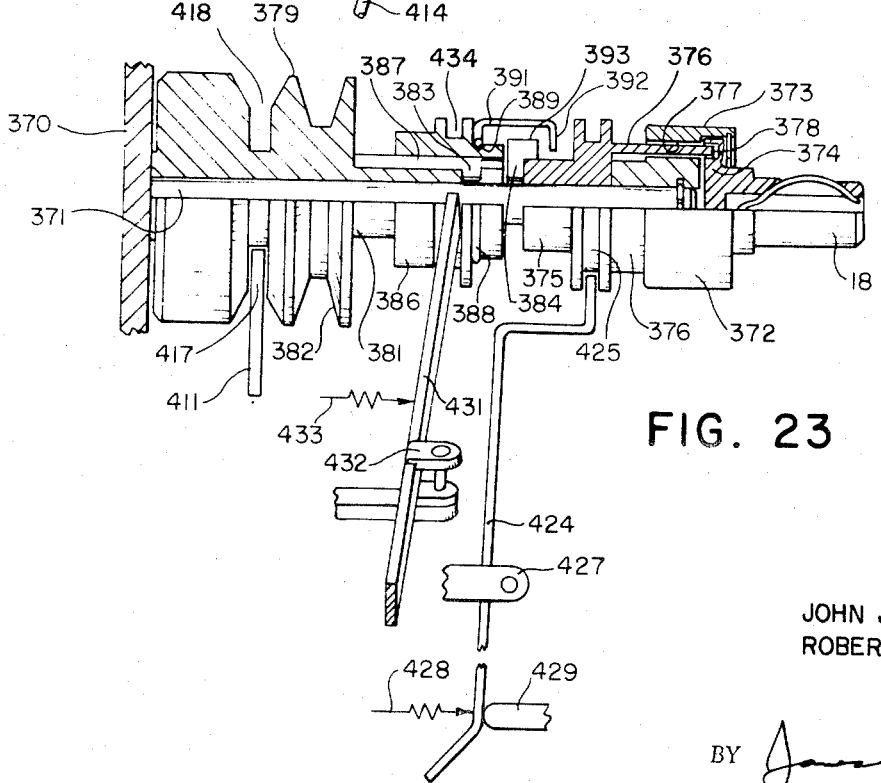
FIG. 23 is a partially cross sectioned rear elevational view of the film supply spindle assembly and of portions of the adjusting members associated therewith.

FIG. 23 best illustrates the film supply spindle assembly, which is supported to the movable back wall member 370 of an arm member 21 by a nonrotatable horizontal shaft 371. The unsupported end of shaft 371 is provided with a weight sensitive drive unit 372 similar to the one incorporated in the film take-up spindle assembly, comprising a rotatable drum member 373 supporting the flange portion 374 of reel drive member 18, which is adapted to accommodate a film supply reel or spool.

A finger member 375 is rotatably and slidably mounted on shaft 371 to the left of the weight sensitive drive unit and is axially movable by the hereinafter described shifting mechanism between its illustrated position and a retracted position slightly to the left thereof. When the finger member is positioned as shown, a plurality of radially spaced fingers 376 thereof extend through corresponding holes 377 in drum member 373 and project into similarly disposed holes 378 in the flange portion 374 of reel drive member 18, thereby coupling the drive reel member directly to the finger member. Upon movement of the finger member to its retracted position, fingers 376 are withdrawn from the drive member flange but still project into holes 377 in the drum member, thus establishing a driving connection between the drive member and the finger member through the torque limiting weight sensitive drive unit.

The supply spindle pulley member 379 is rotatably and slidably suported on shaft 371 and includes a sleeve 381, extending to the right of pulley sheave 382. This pulley member is also movable axially by the shifting mechanism between its illustrated position and a position in which axial lug 383 on sleeve 381 is engaged with a corresponding axial lug 384 on the finger member to couple the finger member and the pulley in positive driving engagement with one another.

A friction clutch collar 386 is slidably mounted on sleeve 381 and is keyed thereto as shown at 387 to prevent relative rotation between the collar and the pulley. As depicted at 388, a resilient wire member partially encircles the end of the collar member adjacent the finger member within a peripheral groove 389, with one end of the wire forming a clutch finger 391. As long as the various spindle components are positioned as illustrated, the inwardly projecting tip 392 of this finger is spaced beyond the right edge of radial extension 393 of finger member lug 384, whereby the finger member and the drive member coupled thereto can rotate freely on shaft 371, independently of the rotation of the pulley member 379. Upon sliding axial movement of the collar member toward the pulley member by the shifting mechanism, however, tip 392 of the clutch finger 391 moves into alignment with lug extension 393. Hence, the finger member is then coupled to the pulley member through the frictional engagement of wire clip member 388 with groove 389, so that, only a predetermined amount of torque can be transmitted from the pulley member to the finger member or vice versa.

DRIVE SYSTEM

The drive system of the projector system, shown in FIGS. 20 and 21, is driven from motor pulley 395 at the rearward end of motor shaft 276 by means of three drive belts, namely, main belt 396, take-up spindle belt 397, and supply spindle belt 398. Above the motor pulley, two idler pulleys 401 and 402 are supported for independent rotation on shaft 22 which also serves as the pivotal support for supply spindle support arm 21. As illustrated in FIG. 21, each of the idler pulleys includes two unitarily connected sheaves, such sheaves being identified from right to left by numerals 403 through 406.

The main drive belt 396 runs upwardly from theleft side of motor pulley 395, behind and over idler sheave 405, over and around control mechanism pulley 167, back over idler sheave 403 and down to the right side of the motor pulley. Accordingly, the continuous movement of the main drive belt along the abovedescribed path, in the direction indicated by the corresponding arrows in FIG. 20, imparts continuous counterclockwise rotation to idler pulley 401 and continuous clockwise rotation to idler pulley 402 and control mechanism pulley 167. The take-up spindle belt 397 is simply trained around pulley member 352 of the take-up spindle assembly and around idler sheave 406, thereby rotating pulley 352 continuously in a clockwise direction. Similarly, supply spindle belt 398 connects supply spindle pulley member 379 to idler sheave 404, thereby imparting continuous counterclockwise rotation to the supply spindle pulley regardless of the position of support arm 21.

SHIFTING MECHANISM

Overall Description — Projection Phase (Cartridge)

The shifting mechanism is employed to adjust the various components of the film supply and take-up assemblies in accordance with carrying out different phases of the projector's operating cycle. To perform such adjustments, this mechanism incorporates various features of the invention disclosed in commonly assigned U.S. Pat. No. 3,300,155, issued on Jan. 24, 1967 in the name of Robert J. Roman, but includes a number of modifications and improvements to that invention as hereinafter described.

In FIGS. 20 – 23, the various components of the subject shifting mechanism and of the film supply and take-up spindle assemblies are shown in solid lines in the respective positions which they assume during the forward projection phase of the projector's operating cycle when the projector is in its cartridge mode of operation. Accordingly, the following explanation will begin on that premise with a description of the four basic elements with the shifting mechanisms in their respective positions shown in the above-mentioned figures.

A rewind shifter bar 411 is pivotally supported for movement about a vertical pivot axis by a stationary pivot structure shown at 412, and is biased into resilient engagement with the upper end portion 413 of shifter bar operating rod 414 by a spring 415. At the rearward end of the shifter bar, a tongue 416 extends upwardly and is received within annular groove 365 of the film take-up pulley member 352 to establish the axial position of that member along shaft 351. Similarly, another tongue member 417 extends upwardly from the forward end of the shifter bar and is received in the tapered annular groove 418 of the film supply spindle pulley member 379 to locate that member along shaft 371.

Shifter bar operating rod 414 is rotably supported along its horizontal center portion 419 by stationary bearings 421 and is bent upwardly at its opposite ends as shown respectively at 413 and 422; the upper end of the rod being positioned in abutting engagement with the left side of the shifting bar and the lower end being held to the left against the influence of spring 415 by ear 423 of retracted cam finger member 291 (FIGS. 16 and 18).

Mode selector lever 424 extends upwardly into annular groove 425 of finger member 375 of the film supply spindle assembly and is pivotally supported on the back wall member 370 of movable arm 21 by a pivot construction shown at 427. At its lower end, the lever is biased to the right by spring 428 and into engagement with a stationary abutment pin 429, thereby positioning the lever as shown to define the corresponding axial location of the finger memer along shaft 371.

Lastly, reverse lever 431 is also pivotally supported to the rear wall member of arm 21 in a diagonal position by pivot structure 432. The upper end of this lever is biased toward the right by spring 433 and is received in annular groove 434 of friction clutch collar 386, thereby establishing the depicted position of the collar by maintaining it in abutment with the adjacent face of finger member lug 384. At its lower end, the reverse lower extends to the left of the upwardly extending arm 435 of control lever 36 as also shown from the front in FIG. 18.

From the previous description of the film supply and take-up spindle assemblies, it will be recalled that the illustrated positioning of the various components of those assemblies allows the film supply reel to rotate freely and impart clockwise rotation to the take-up reel through weight sensitive drive unit 353. Accordingly, the film unwinds freely from the cartridge as it is advanced through the gate by the pulldown mechanism and absorbed by the film take-up reel under controlled tension.

REVERSE PROJECTION PHASE (CARTRIDGE)

To project the film in reverse, the operator depresses control lever 36, thus adjusting the cam controlled claw mechanism to advance the film intermittently through the gate in an upward (reverse) direction rather than in the normal downward (forward) direction. Simultaneously, such movement of lever 36 rocks its upwardly extending arm 435 to the right, as shown in broken lines in FIG. 18, whereby it engages and effects corresponding displacement of the lower end of reverse lever 431 against the influence of spring 433. Accordingly, the friction clutch collar member is moved to the left to align the tip 392 of clutch finger 391 with radial lug extension 393 on finger member 375, thus imparting counterclockwise rotation to the film supply spool through the torque limiting friction clutch assembly. Consequently, as the film is fed upwardly through the gate by the claws it is unwound from the film take-up reel under the control of weight sensitive drive unit 353 and snubber shoe 263 and is rewound smoothly onto the film supply spool.

The reason for employing this frictional clutch arrangement during the reverse projection operation, rather than utilizing weight sensitive drive unit 372 for this purpose, is that the torque characteristics required of the latter unit for proper performance of the projector during its reel mode of operation preclude that unit from applying sufficient torque to the film to perform the subject operation due to the significant weight discrepancy between a cartridge film spool and a film supply reel.

When control lever 36 is returned to its raised position, the film advancing mechanism is again adjusted to advance the film downwardly through the gate and the reverse lever is restored to its former position by spring 433 to reestablish the former position of friction clutch collar 386, thereby allowing the forward projection operation to proceed.

REVIEW PHASE (CARTRIDGE)

When review lever 37 is displaced manually in a rearward direction, cam finger member 291 is moved to its operative position by spring wire 296 to open the gate, as previously explained. As was also previously explained, the position of shifter bar 411 illustrated in FIGS. 20 – 23 is defined by the respective engagement of the upper and lower ends of operating rod 414 with the left surface of the rearward end of the shifter bar and with each 423 of the cam finger member. Therefore, such movement of the cam finger member now allows spring 415 to pivot the rearward end of the shifter bar to the left into contact with fixed abutment member 436 by displacing the operating rod to the position shown in FIG. 19, thereby simultaneously moving the forward end of the bar to the right. Since the pivotal position of the shifter bar determines the axial positions of pulley members 352 and 379 along their respective shafts 351 and 371, it will be recognized that the pulley member 352 is thus disengaged from weight sensitive drive unit 353 and that pulley member 379 is positively coupled to the corresponding reel drive member 18 by the driving engagement of pulley sleeve lug 383 with finger member lug 384. Accordingly, the film is rewound onto the cartridge spool from the freely rotatable take-up reel until review lever 37 is returned to its forward position, whereupon the resulting retraction of the cam finger member causes operating rod 414 to restore the shifter bar to its former position, thus allowing the film projection phase to proceed.

REWIND PHASE (CARTRIDGE)

The rewind phase of the projector's operating cycle is initiated by the depression of trigger lever 38, either manually or in response to downward movement of snubber member 32, whereby latch member 299 is released from lip 303 of the cam finger member to allow that member to assume its operative position. Therefore, it will be seen that this movement of the cam finger member adjusts the shifter bar in exactly the same manner previously described in connection with the operation of the review mechanism, thereby causing the film to be rewound into the cartridge through the open film gate. In this case, however, the rewinding adjustment of the spindle assemblies by the shifter bar remains in effect until the cam finger member is again retracted by the cocking arm in response to corresponding movement of the reset lever during the subsequent operation of the control cam mechanism.

REEL MODE OF OPERATION

Before proceeding with the following explanation of the projector's reel mode of operation, it should be pointed out that the substantial difference in size and weight between the cartridge film spools and the film supply reels requires basic changes in the manner in which the two modes of operation are carried out.

Due to the relatively small diameter of the roll of film that can be accommodated in a film cartridge, the film tension required to unwind the film is considerably greater than that needed to unwind a larger diameter roll on a film reel. Therefore, the cartridge spool is allowed to rotate freely during the projection of the film supplied thereby, retarded only by the friction inherent in the spindle assembly. As a result of normally encountered variations in film speed and tension, the freely rotatable reel will occasionally rotate faster than the speed at which the film is being used, thus causing the film to expand on the roll. Due to the relatively low inertia of the spool, however, such expansion cannot cause film tension variations exceeding the tension control capabilities of the snubber member. Additionally, the internal structure of the cartridge prevents the film from ever expanding beyond the spool flanges. Conversely, when the projector is loaded with a relatively large and heavy film supply reel, its correspondingly greater momentum and the absence of any film restraining structure necessitate the employment of means for restraining free rotation of the reel to prevent such film roll expansion from occurring. Accordingly, whenever a film supply reel is loaded into the subject projector, it is coupled to the supply spindle pulley member, either directly or through the weight sensitive drive unit 372, but is never allowed to rotate freely.

During the rewinding of the film onto the film supply reel, the length of film between the two reels necessarily assumes a very high linear velocity as the supply roll approaches its maximum diameter; such high velocity being unavoidable if the supply reel is rotated with sufficient speed to rewind the film in a reasonably short length of time. Accordingly, since such high velocity movement of the film is incompatible with rewinding it through the open gate and the various film guide members associated therewith, the previously described review and rewind mechanisms are simply disabled during the reel mode of operation.

PROJECTION PHASE (REEL)

When arm member 21 is raised to its upper position, the corresponding movement of mode selector lever 424 moves the lower end of that lever out of engagement with stationary abutment pin 429. Therefore, spring 428 moves the upper end of the lever 424 to the left to effect corresponding movement of finger member 375 to its retracted position by overpowering weaker spring 433 as collar member 386 is also moved to the left by lug 384 of the finger member. In its retracted position, the finger member is coupled to supply spindle pulley 379 by the engagement of axial lugs 383 and 384. As previously related, the movement of the finger member to its retracted position withdraws fingers 376 thereof from engagement with the flange portion 374 of reel drive member 18, but not out of engagement with holes 377 in drum member 373. Consequently, pulley member 379, finger member 375 and drum member 373 are positively connected to one another and rotate continuously in a counterclockwise direction; with finger member 375, in turn, being coupled to a reel on drive member 18 through the now operative weight sensitive drive unit 372.

By virtue of the raised position of the film supply spindle assembly, pulley 370 is out of engagement with the forward end of shifter bar 422, but the rearward end of shifter bar remains engaged, with pulley member 352 of the take-up spindle assembly Therefore, as the film is advanced through the film gate, the tension exerted on the film by the supply and take-up reels is controlled in proportion to the sizes of the respective film rolls by the corresponding weight sensitive drive units.

REVIEW (REEL)

If the review control lever were moved to its rearward position during the film projection phase, the film gate would be temporarily opened and the film take-up reel would be disengaged from driving relation with the corresponding pulley member. However, the film could not be rewound onto the supply reel inasmuch as the weight sensitive drive unit of the supply spindle assembly cannot exert sufficient torque on the supply reel to effictively rewind the film in opposition to the inertia and frictional forces opposing unwinding rotation of the film take-up reel, and the friction encountered by the film in the gate and film guide passageways. Therefore, the film would remain stationary in the gate and would be in danger of melting or burning due to the continuous exposure of a single frame of the film to the projection lamp. To prevent this occurrence, the review control lever is blocked from movement to its rearward position whenever arm 21 is raised. As illustrated in FIGS. 16 and 18 – 20, this is effected by slide member 437; which is slidably supported by studs 438 extending through elongate slot 439 and urged upwardly by spring 440. Whenever arm 21 is in its lowered position, the slide member is positioned as shown in solid lines in the above mentioned Figures by the engagement of the upper end of the slide member with lower edge surface 441 of the left wall member 370 of arm 21. Accordingly, blocking ear 442 at the lower end of the slide member is below and out of the path of movement of the forwardly extending tongue 342 of review control lever 37. When arm 21 is raised, however, the slide member moves upwardly under the influence of spring 440 to a position established by the engagement of the lower end of slot 439 with the lower stud 438, as shown in phantom lines in FIGS. 18 and 19. In this position, blocking ear 442 is aligned with the right edge of the forwardly extending tongue of control lever 37, thereby positively preventing rearward movement of the externally accessible end of the lever.

REVERSE (REEL)

Although reverse lever 431 is also raised by the upward movement of arm 21, thereby removing its lower end from engageable relation with the upwardly extending arm 435 of control lever 36, the projection of the film in reverse can nevertheless be accomplished by moving the control lever downwardly. This operation is possible because of the fact the film supply and take-up reels are frictionally coupled through the corresponding weight sensitive drive units to the respective pulley members 379 and 352, each of which rotates continuously in the direction in which film is wound onto the corresponding reel. Thus, as the film is now moved upwardly through the gate, the resulting film tension below the gate overpowers drive unit 353 to allow the film to be unwound from the take-up reel as the corresponding decrease in film tension above the gate enables the supply reel to be rotated by drive unit 372 in a rewinding direction.

REWIND (REEL)

When the film has been completely projected, i.e., when it is wound entirely onto the take-up reel, its trailing end is manually reattached to the supply reel hub, whereupon the supply spindle assembly is adjusted to rewind the film in opposition to the weight sensitive drive unit of the take-up assembly by coupling drive member 18 directly to pulley 379. This adjustment is accomplished by means of a manually operable shifting cam member 444, which is pivotally supported to the movable back wall member 370 of arm 21 adjacent pulley member 379 by a pivot pin 445. In its inoperative position shown in FIGS. 20 and 21, the cam member is entirely out of engagement with the pulley member, with operating lever 446 received in slot 447 of the curved front wall 45 of the arm member. When the lever is manually pivoted downwardly to its operative position defined by pin 448 as shown in broken lines in FIG. 20, the arcuate tapered end portion 449 of the cam member is wedged between wall member 370 and the left face of pulley member 379, thereby displacing the pulley member to the right. Since the pulley member is already in axial engagement with finger member 375, such movement also displaces the finger member by overpowering spring 428, thereby reengaging fingers 376 with holes 378 in flange portion 374 of reel drive member 18. Thus, as long as the cam member remains frictionally retained in its operative position, the film supply reel is coupled directly to pulley member 379.

Upon completion of the rewinding operation and removal of the rewound supply reel, lever 446 is manually returned to its inoperative position to readjust the film supply spindle assembly to its former condition. If the operator lowers arm member 21 without having first repositioned lever 446, this is accomplished automatically by the engagement of the forwardly extending lever with the top wall of the projector casing. Theis feature therefore prevents possible misalignment between tongue member 417 of shifter bar 411 and the pulley member groove 418, which is tapered to further insure proper reception of the tongue member therein. Similarly, if reverse control lever 36 should happen to be in its downward (reverse) position when arm 21 is lowered, the slanted rearward end portion 450 of reverse lever 431 will nevertheless engage the left side of arm 435, thereby adjusting the film supply spindle assembly as lever 431 is cammed to the right in response to the movement of arm 21.

Although the foregoing description refers to a specific embodiment of the invention, comprising a cinematographic projector apparatus, it should be understood that the various components which are combined in the apparatus are not limited in novelty or utility to such an overall combination but may be employed advantageously in other type of apparatus, including tape recorders or the like, either independently or in various combinations or subcombinations with one another. Accordingly, the foregoing disclosure of the invention is to be considered only as illustrative and not as limiting the scope of the invention, which is defined by the appended claims.

We claim:
1. Apparatus for handling an elongate strip of web material having a leading end, said apparatus comprising:
   a. means for selectively rotatably supporting a supply roll of web material at a first position and a second position;
   b. means defining a guide path for receiving a portion of a strip of web material unwound from a supported supply roll;
   c. means for advancing the strip of web material through said guide means;
   means for engaging the leading end of the strip of web material initially wound upon a supply roll supported at said first position and for feeding the end of that strip into said guide path defining means, said engaging and feeding means being positioned to prevent its engaging the leading end of a strip of web material initially wound onto a supply roll supported at said second position;
   e. a member movable between an inactive position beyond said guide path and an active position, said movable member when in its active position defining with said web engaging and feeding means a structure for driving into said guide means the leading end of a strip of web material introduced manually into said structure from a supply roll supported at said second position.

2. Apparatus as defined in claim 1 further comprising mode determining means for retaining said movable member in its inactive position when a supply roll is supported at said first position and for moving said movable member to its active position when a supply roll is supported at said second position.

3. Apparatus as defined in claim 1 wherein said means for supporting a supply roll comprises:
   a. a rotatable drive member adapted to rotatably support a supply roll mounted thereon; and b. selectively positionable means for supporting said drive member for movement to
  1. a first location in which a supply roll mounted on said drive member is rotatably supported at said first position, and
  2. a second location at which a supply roll mounted on said drive member is rotatably supported at said second position.

4. Apparatus as defined in claim 3 further comprising:
  a. means for driving said drive member;
  b. clutch means selectively adjustable for
    1. disconnecting said drive member and said driving means,
    2. operatively connecting said drive member and said driving means for positive rotation thereby, and
    3. operatively connecting said drive member and said driving means by frictional means adapted to limit the torque transmittable between said driving means and said drive member; and
  c. control means adapted to selectively adjust said slutch means in accordance with functions sequentially performed by said machine to effect an operating cycle of said machine.

5. Apparatus as defined in claim 4 further comprising means responsive to the location of said selectively positionable means for adjusting said control means to
  a. a first condition in which said control means adjusts said clutch means in accordance with functions sequentially performed by said machine to effect a first predetermined operating cycle of said machine when said machine is provided with an elongate strip of material supplied by a supply roll supported at said first location, and to
  b. a different second condition in which said control means adjusts said clutch means in accordance with functions sequentially performed by said machine to effect a different predetermined second operating cycle of said machine when said machine is provided with an elongate strip of material supplied by a supply roll supported at said second location.

6. A machine adapted to be threaded with an elongate strip of material supplied from a supply roll, said machine comprising:
  a. spindle means for rotatably supporting a supply roll at a selected one of a first location and a second location;
  b. means defining a threading passageway;
  c. an automatic stripping mechanism including
    1. an endless moving drive member engageable with a supply roll rotatably supported at said first location to impart unwinding rotation to such supply roll,
    2. a stripping member adapted to guide the leading end of a strip on a supply roll so engaged with said endless moving drive member into said passageway as said leading end is moved away from its supply roll by such unwinding rotation thereof; and
  d. a manual threading member movable between
    1. an inactive position in which said manual threading member is spaced from said endless moving drive member, and
    2. an active position in which said manual threading member is in contact with said endless moving drive member to define a nip adapted to receive the manually inserted outermost end of a strip of material wound onto a supply roll supported at said second position beyond engageable relation with said drive member, whereby said outermost end is advanced into said passageway by said endless moving drive member.

7. The invention defined by claim 6 including;
  a. means supporting said drive member for movement between,
    1. a retracted position out of engagement with a roll supported in said first location, and
    2. an extended position in engagement with a roll supported in said first location;
  b. first operating means adapted upon operation thereof to move said drive member from said retracted position to said extended position;
  c. second operating means adapted upon operation thereof to move said manual threading member from said inactive position to said active position; and
  d. coordinating means adapted
    1. to disable operation of said first operating means whenever a supply roll is supported by said spindle means at said second location, and
    2. to disable operation of said second operating means whenever a supply roll is supported by said spindle means at said first location.

8. In a motion picture projector including:
  a. means for supporting a film supply roll of an elongate wound strip of film;
  b. film moving means adjustable
    1. to a first condition for moving said strip of film longitudinally away from said film supply roll, and
    2. to a second condition for moving said strip of film longitudinally toward said film supply roll as said strip is wound onto said roll; and
  c. a threading device adjustable
    1. to an inactive condition, and
    2. to an active condition in which said device is adapted to receive the leading end of said strip from said roll and to feed said leading end into engagement by said film moving means; the improvement comprising:
  d. interlock means responsive to the adjustment of said film moving means for precluding adjustment of said threading device from said inactive condition to said active condition so long as said film moving means is adjusted to said second condition.

9. A machine adapted to move an elongate strip of web material longitudinally past a position established in predetermined relation to an operational element of said machine, said machine being characterized by:
  a. roll support means adapted to receive and rotatably support a supply roll of said web material;
  b. guide means for defining a path adapted to receive a portion of a strip of web material unwound from a supply roll supported by said roll support means along which such strip is movable longitudinally past said predetermined position;
  c. strip advancing means adapted to effect such longitudinal movement of the strip of web material received by said guide means as such strip is thereby unwound from said supply roll;
  d. a self-threading mechanism including a threading mdMber movable between an inactive position and an active position in which said threading member engages the leading end of the strip of web material initially wound upon a supply roll supported by said support means to feed the leading end of said strip along a predetermined threading path into reception by said guide means; nd a manual threading mechanism including a guide member movable between an inactive position beyond said threading path and an active position in which said guide member at least partially defines a structure adapted to feed into said guide means the leading end of a strip of web material introduced manually into said structure from said supply roll.

10. The invention defined by claim 9 including means for disabling movement of a selected one of said members from its respective inactive position.

11. The invention defined by claim 10 including:
 a. sensing means for detecting the arrival of said strip at a predetermined location along said guide means as said strip is fed into said guide means by one of said mechanisms, and
 b. means responsive to said sensing means for automatically moving to its respective inoperative position the one of said members located in its respective operative position when said strip is so detected by said sensing means.

* * * * *